(12) United States Patent
Tomobuchi

(10) Patent No.: US 7,435,198 B2
(45) Date of Patent: Oct. 14, 2008

(54) TOOTHED BELT

(75) Inventor: Masato Tomobuchi, Osaka (JP)

(73) Assignee: Tsubakimoto China Co., Osaka (JP)

( * ) Notice: Subject to any disclaimer, the term of this patent is extended or adjusted under 35 U.S.C. 154(b) by 532 days.

(21) Appl. No.: 11/212,786

(22) Filed: Aug. 26, 2005

(65) Prior Publication Data

US 2006/0063627 A1 Mar. 23, 2006

(30) Foreign Application Priority Data

Sep. 17, 2004 (JP) ............................. 2004-272279

(51) Int. Cl.
*F16G 5/00* (2006.01)
(52) U.S. Cl. ..................... 474/260; 428/421; 428/424.7
(58) Field of Classification Search .................. 474/70, 474/237, 260; 428/53, 140
See application file for complete search history.

(56) References Cited

U.S. PATENT DOCUMENTS

| | | | |
|---|---|---|---|
| 5,234,387 A * | 8/1993 | Fujiwara et al. | 474/205 |
| 5,630,770 A * | 5/1997 | Fujiwara et al. | 417/326 |
| 5,860,883 A * | 1/1999 | Jonen et al. | 474/205 |
| 6,007,897 A * | 12/1999 | Tamaki et al. | 428/172 |
| 6,220,983 B1 * | 4/2001 | Osako et al. | 474/260 |
| 6,361,462 B1 * | 3/2002 | Takada et al. | 474/251 |
| 6,375,590 B1 * | 4/2002 | Tomobuchi et al. | 474/263 |
| 6,406,397 B1 * | 6/2002 | Isshiki et al. | 474/263 |

FOREIGN PATENT DOCUMENTS

| | | |
|---|---|---|
| EP | 0 674 121 | 9/1995 |
| EP | 1 052 425 | 11/2000 |
| EP | 1 157 813 | 11/2001 |
| JP | 07-151190 | 6/1995 |

* cited by examiner

*Primary Examiner*—Bradley King
*Assistant Examiner*—San Aung
(74) *Attorney, Agent, or Firm*—Dann, Dorfman, Herrell and Skillman, P.C.; Henry H. Skillman

(57) ABSTRACT

A toothed belt having a treated light-colored tooth cloth comprised of a first layer in which rubber is impregnated in an original canvas, a second rubber layer formed on a surface side of the first layer, and a third rubber layer formed on the back side of the first layer and adhered to the belt body rubber layer. The rubber of the first layer may be obtained by formulating polytetrafluoroethylene, phenol resin, titanium oxide, a potassium titanate fiber and zinc methacrylate in a mixture obtained by formulating a hydrogenated nitrile rubber and a polymer alloy in which zinc methacrylate is finely distributed in the hydrogenated nitrile rubber in a range of parts by weight of 95:5 to 60:40.

19 Claims, 13 Drawing Sheets

Fig. 9
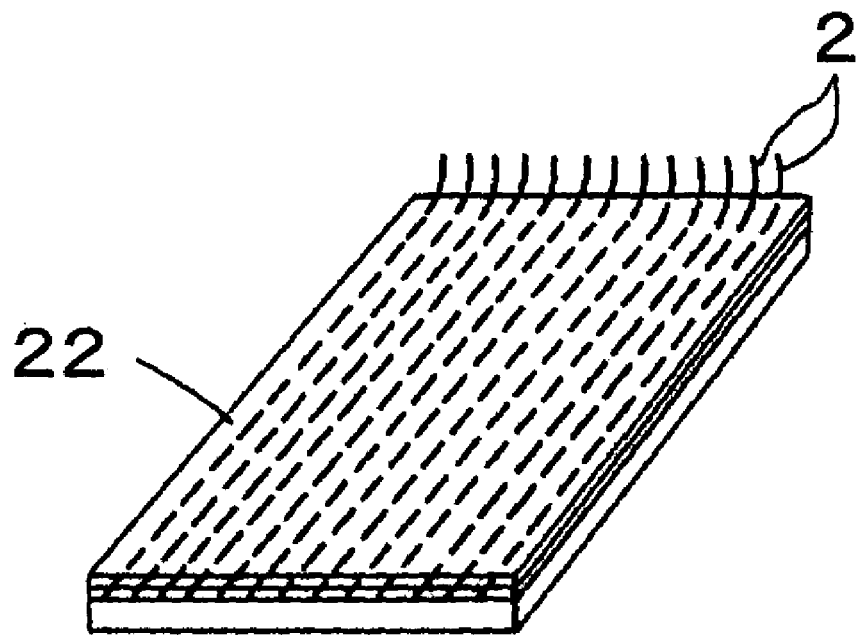
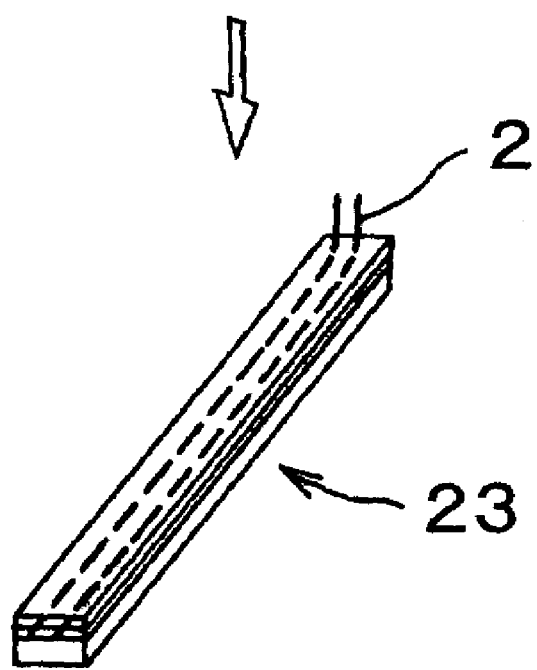

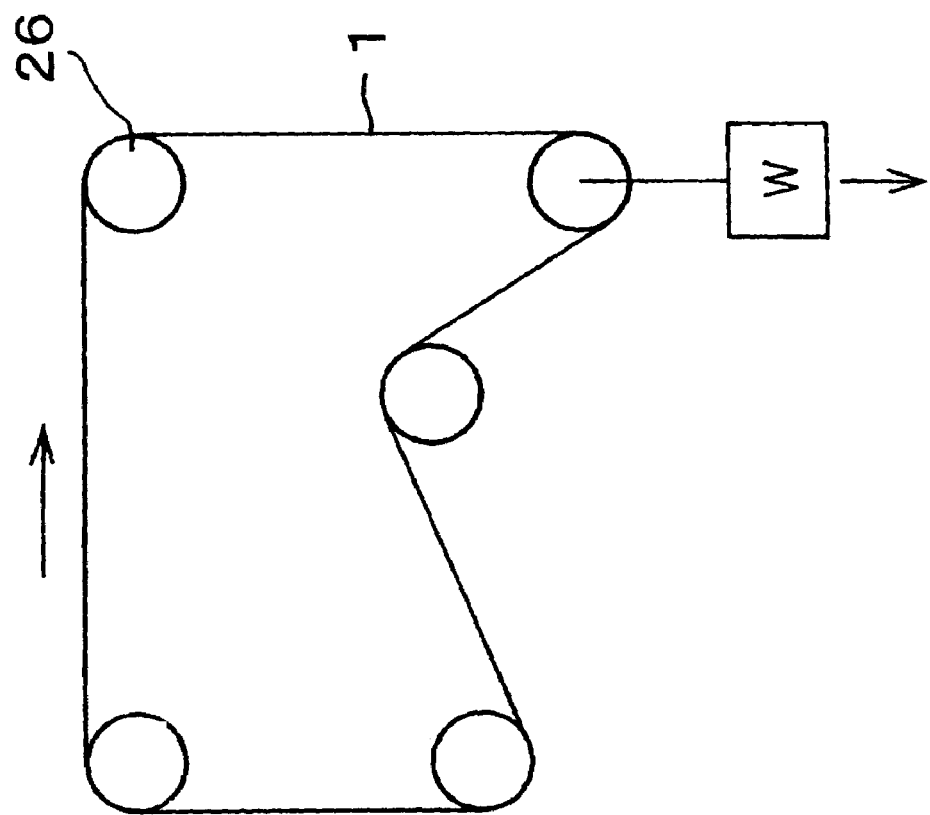

US 7,435,198 B2

TOOTHED BELT

This application claims priority under 35 U.S.C. §119(a) to Japanese Patent Application No. 2004-272279, filed Sep. 17, 2004. The foregoing application is incorporated by reference herein.

FIELD OF THE INVENTION

The present invention relates to a toothed belt used for power transmission.

BACKGROUND OF THE INVENTION

A toothed belt is usually trained between a driving toothed pulley and a driven toothed pulley and has been used as a power transmitting belt for general industrial equipment or OA (Office Automation) equipment, a timing belt for an automobile internal-combustion engine, a driving belt for a bicycle, and the like. The toothed belt is usually comprised of a carbon black-containing black belt body rubber layer in which a plurality of core strands is buried in the longitudinal direction of the belt. On a surface of this belt body, a rubber layer forms a plurality of teeth portions and on the surface of the teeth portions is a tooth cloth formed in a coated manner.

A toothed belt has been previously described in which a first rubber composition consisting of polytertafluoroethylene (PTFE) and carbon black-containing hydrogenated nitrile rubber (HNBR) is dissolved in a solvent. The dissolved subject is then immediately impregnated into an original canvas to form a teeth canvas layer and an adhesive rubber is applied to a back side of the teeth canvas layer so that the obtained structure is adhered to a belt body rubber layer (Japanese Laid-open Patent Publication No. Hei. 7-151190).

SUMMARY OF THE INVENTION

In accordance with the instant invention, a toothed belt is provided in which a plurality of teeth portions are formed on at least one surface of a belt body rubber layer in which a plurality of core strands are buried in the longitudinal direction of the belt and a treated tooth cloth is coated on the surface of the teeth portions. The treated tooth cloth may comprise a first layer in which rubber is impregnated in an original canvas, a second rubber layer formed on a surface side of the first layer and in direct contact with a toothed pulley, and a third rubber layer formed on the back side of the first layer and adhered to the belt body rubber layer. The rubber in the first layer may consist of a rubber composition obtained by formulating polytetrafluoroethylene (PTFE), phenol resin, titanium oxide, a potassium titanate fiber and zinc methacrylate in a mixture obtained by formulating a hydrogenated nitrile rubber (HNBR) and a polymer alloy (ZSC) in which zinc methacrylate is finely distributed in the hydrogenated nitrile rubber in a range of parts by weight of 95:5 to 60:40. The rubber composition may have an increased crosslink density by increasing the amount of crosslinking agent as compared to the third rubber layer. The hydrogenated nitrile rubber may have an iodine value of 4 to 56 g and the polymer alloy (ZSC) may have a Mooney value of at least 70 at 100° C. The polytetrafluoroethylene may have an average particle diameter of 3 to 10 μm and a surface area of 2 to 10 $m^2/g$, be powder-shaped with disintegration property, and be formulated by parts by weight of 40 to 120 with respect to a part by weight of 100 of the mixture.

In accordance with another aspect of the instant invention, the second rubber layer of the tooth cloth may comprise a rubber composition obtained by formulating polytetrafluoroethylene (PTFE), phenol resin, titanium oxide, potassium titanate fiber and zinc methacrylate in a mixture obtained by formulating a hydrogenated nitrile rubber (HNBR) and a polymer alloy (ZSC) in which zinc methacrylate is finely distributed in the hydrogenated nitrile rubber in a range of parts by weight of 95:5 to 60:40. The rubber composition may have an increased crosslink density by increasing the amount of crosslinking agent as compared with the rubber composition of the first layer. The hydrogenated nitrile rubber (HNBR) may have an iodine value of 4 to 56 g and said polymer alloy (ZSC) may have a Mooney value of at least 70 at 100° C. The polytetrafluoroethylene may have an average particle diameter of 3 to 10 μm and a surface area of 2 to 10 $m^2/g$, be powder-shaped with disintegration property, and be formulated by parts by weight of 80 to 300 with respect to a part by weight of 100 of the mixture.

In accordance with yet another aspect, the third rubber layer may comprise a rubber composition obtained by formulating phenol resin and hydrophobic silica in a mixture obtained by formulating a hydrogenated nitrile rubber (HNBR) and a polymer alloy (ZSC) in which zinc methacrylate is finely distributed in the hydrogenated nitrile rubber (HNBR) in a range of parts by weight of 99:1 to 80:20. The rubber composition may have the same or smaller polymer alloy (ZSC) formulation ratio as compared with the first layer and second rubber layer. The hydrogenated nitrile rubber (HNBR) may have an iodine value of 4 to 56 g and the polymer alloy (ZSC) may have a Mooney value of at least 70 at 100° C.

In accordance with yet another aspect, the belt body rubber layer of the toothed belt comprises a rubber composition which is a hydrogenated nitrile rubber (HNBR) composition and whose crosslinking system is sulfur crosslinking or organic peroxide crosslinking. The rubber composition may be obtained by formulating a hydrogenated nitrile rubber (HNBR) and a polymer alloy (ZSC) in which zinc methacrylate is finely distributed in the hydrogenated nitrile rubber in a range of parts by weight of 95:5 to 5:95. The hydrogenated nitrile rubber (HNBR) may have an iodine value of 4 to 56 g and the polymer alloy (ZSC) may have a Mooney value of at least 70 at 100° C. Alternatively, the rubber composition may be obtained by formulating a polymer alloy (ZSC) in which zinc methacrylate is finely distributed in a hydrogenated nitrile rubber and ethylene-vinyl acetate copolymer (EVA) in a range of parts by weight of 95:5 to 5:95. The polymer alloy (ZSC) may have a Mooney value of at least 70 at 100° C. and the ethylene-vinyl acetate copolymer (EVA) may have an amount of vinyl acetate of 40 to 91% and a Mooney value of 20 to 70 at 100° C. Alternatively, the rubber composition may be obtained by formulating a mixture formulated by a polymer alloy (ZSC) in which zinc methacrylate is finely distributed in a hydrogenated nitrile rubber and ethylene-vinyl acetate copolymer (EVA) in a range of parts by weight of 95:5 to 5:95, and a hydrogenated nitrile rubber (HNBR) in a range of 95:5 to 60:40.

In yet another embodiment, the treated tooth cloth is comprised of an original canvas made of single nylon 6, nylon 66, aramide fiber, poly-para-phenylene benzoxazlole fiber or the like or a mixture thereof.

In another embodiment, the potassium titanate fiber has a fiber diameter of 0.05 to 0.6 μm, a fiber length of 1 to 20 μm, and a bulk specific gravity of 3 to 4 $g/cm^3$, and is formulated in a range of parts by weight of 1 to 50 with respect to a part by weight of 100 of the mixture.

In yet another embodiment, the phenol resin is selected from the groups consisting of alkyl phenol modified resin, a cresol modified resin, a cashew modified resin, a pure phenol resin and the like, and is formulated in a range of parts by weight of 2 to 50 with respect to a part by weight of 100 of the mixture.

In yet another embodiment, the hydrophobic silica described hereinabove has a bulk specific gravity of 40 to 230 g/L, an average particle diameter of 0.5 to 100 μm, and is formulated in a range of parts by weight of 5 to 60 with respect to a part by weight of 100 of the mixture.

In still another embodiment, the zinc methacrylate described hereinabove is formulated singly in a range of parts by weight of 1 to 50 with respect to a part by weight of 100 of the mixture.

In yet another embodiment, the crosslinking agent is an organic peroxide selected from the group consisting of 2,4-dichlorobenzoyl peroxide, benzoyl peroxide, 1,1-di-t-butylperoxy 3,3,5-trimethyl cyclohexane, 2,5-dimethyl 2,5-dibenzoyl peroxyhexane, n-butyl-4,4-di-t-butyl peroxyvalerate, dicumyl peroxide, t-butyl peroxibenzoate, di-t-butyl peroxidiisopropylbenzene, t-butylcumyl peroxide, 2,5-dimethyl 2,5-di-t-butyl peroxihexane, di-t-butyl peroxide, 2,5-dimethyl 2,5-di-t-butyl peroxihexane-3 and the like. The organic peroxide may be formulated in parts by weight of 0.5 to 30 in a larger amount than in the third rubber layer.

In yet another embodiment, an adhesion amount of the rubber composition of the treated tooth cloth is in a range of weight ratio of 30 to 80 in the first layer after dry with respect to the weight of 100 of the original canvas, is in a range of weight ratio of 2 to 30 in the second rubber layer after dry with respect to the weight of 100 of the original canvas, and in a range of weight ratio of 30 to 70 the third rubber layer is after dry with respect to the weight of 100 of the original canvas.

In yet another embodiment, the titanium oxide in the first layer is formulated in a range of parts by weight of 5 to 40 with respect to a part by weight of 100 of the mixture. The second rubber layer and third rubber layer use a rutile, anatase titanium oxide or the like.

BRIEF DESCRIPTIONS OF THE DRAWING

Figure 6:
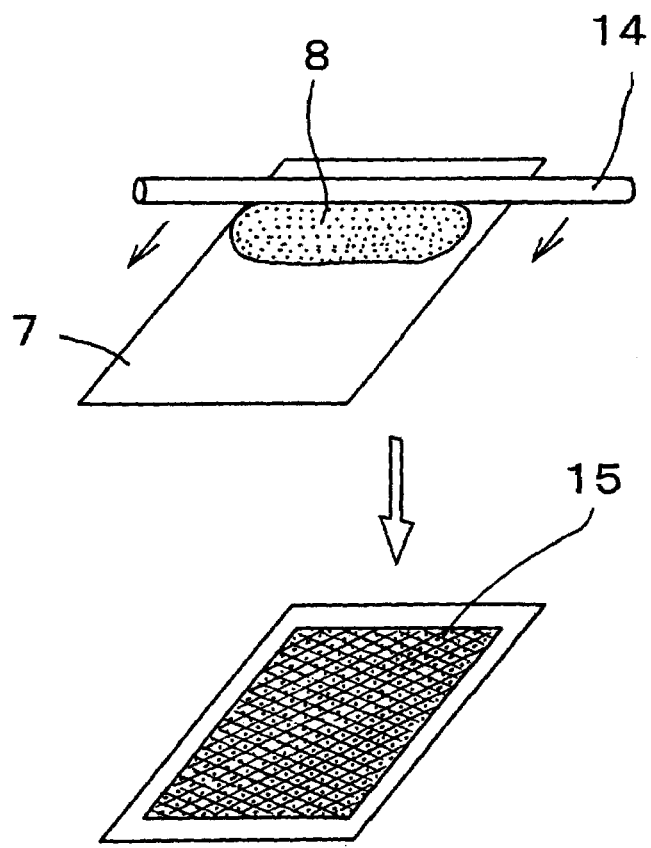

FIG. 6 is an explanatory view for forming a sample in which a formulation rubber 8 is spread on a canvas 7. 14 represents a glass bar and 15 represents the treated canvas.

Figure 7:
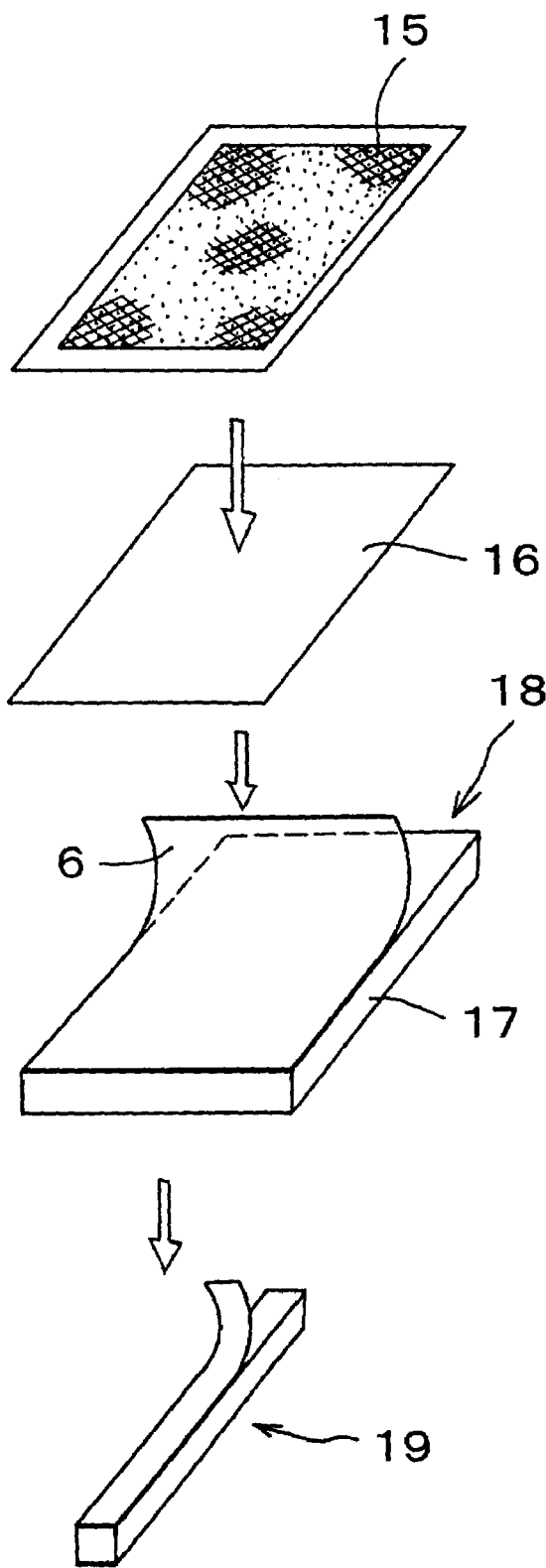

FIG. 7 is an explanatory view for forming a tooth cloth peel strength test sample from the sample shown in FIG. 6. 16 represents the rubber sheet upon which the treated canvas 15 is overlapped. The rubber to be adhered 17 is adhered to the treated tooth cloth 6 by vulcanization 18 to obtain the sample 19.

Figure 8:
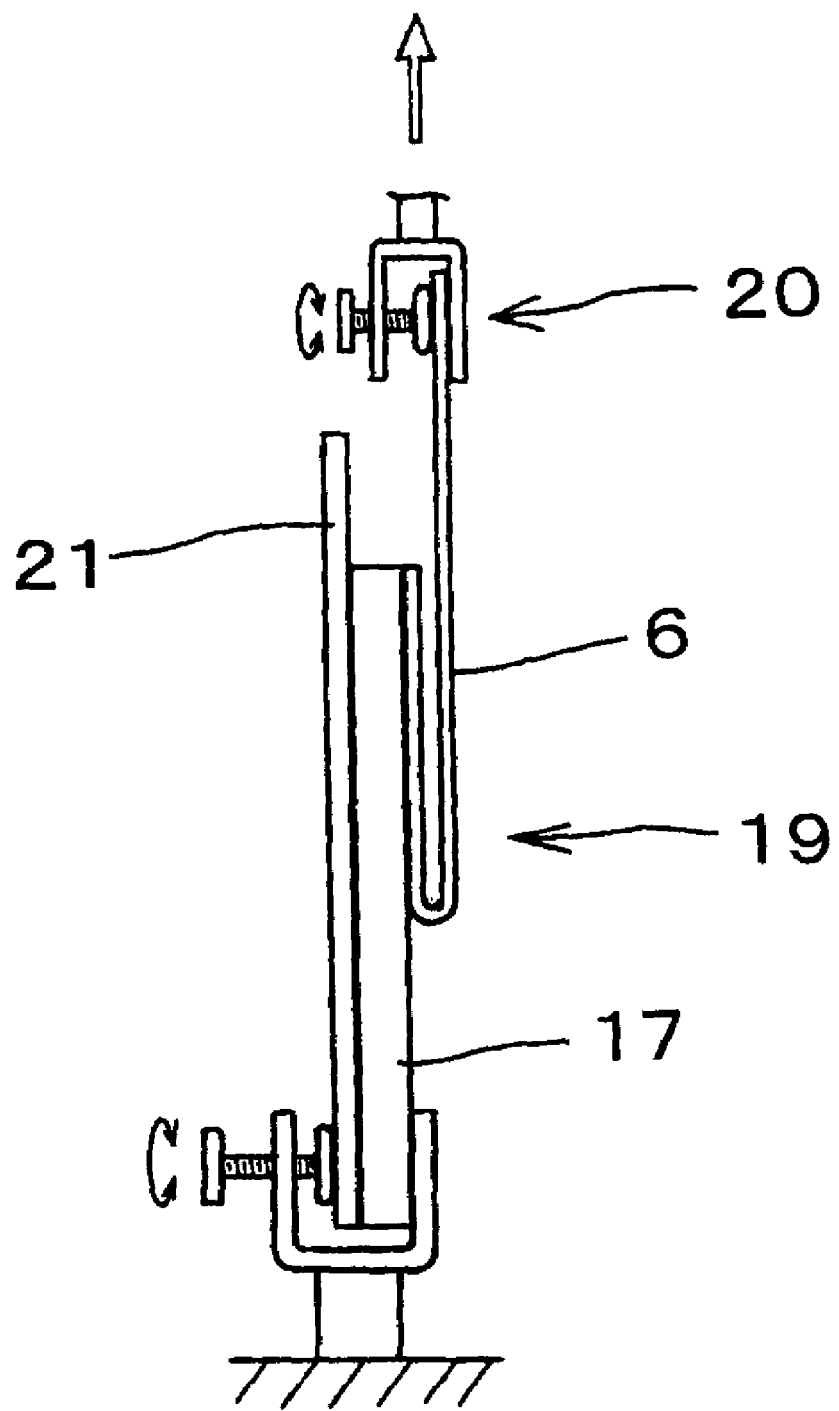

FIG. 8 is an explanatory view of peel strength measurement in which a tooth cloth for a test sample is peeled with a tensile. 20 represents the tensile tester and 21 represents a plate.

FIG. 9 is an explanatory view for forming a core strand peel test. 22 represents a rubber sheet for the adhesion test and 23 represents a sample cut therefrom.

Figure 10:
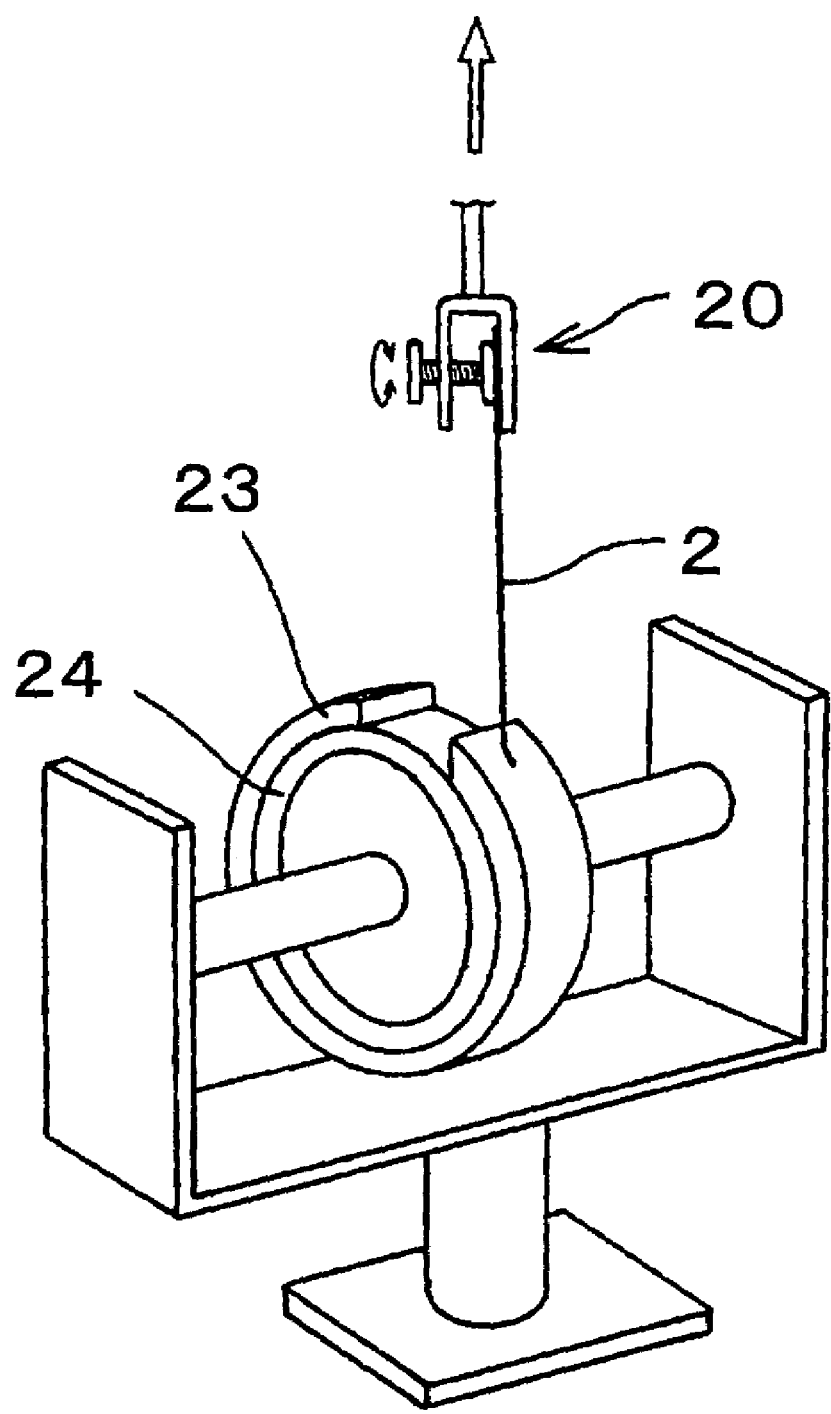

FIG. 10 is an explanatory view of peel strength measurement in which a core strand for a test sample is peeled with a tensile tester. 24 represents a circular jig.

Figure 11:
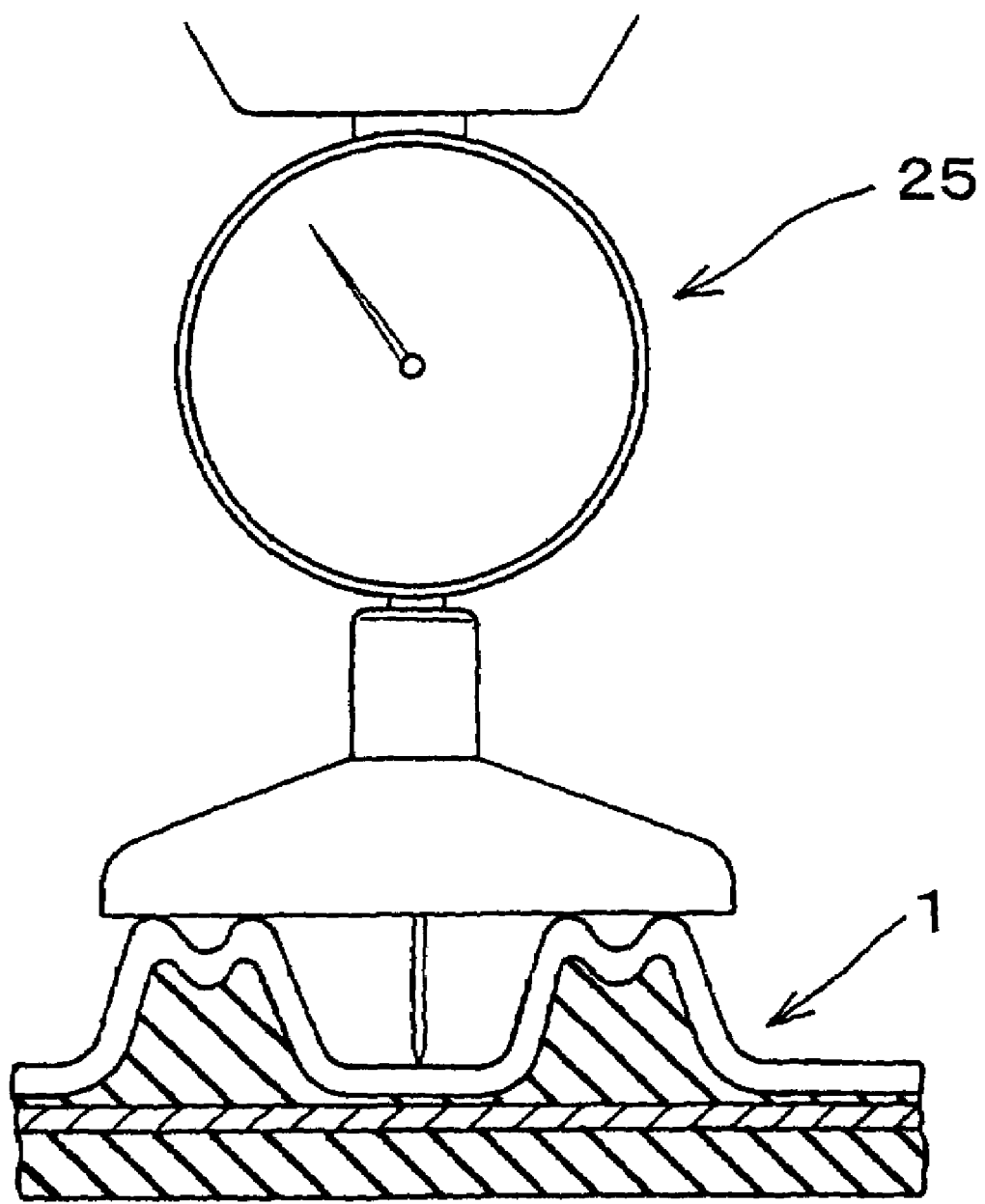

FIG. 11 is an explanatory view of an embodiment in which a depth from the tooth top to the tooth bottom of a toothed belt is measured with a depth gauge. 25 represents a depth gauge.

Figure 12:
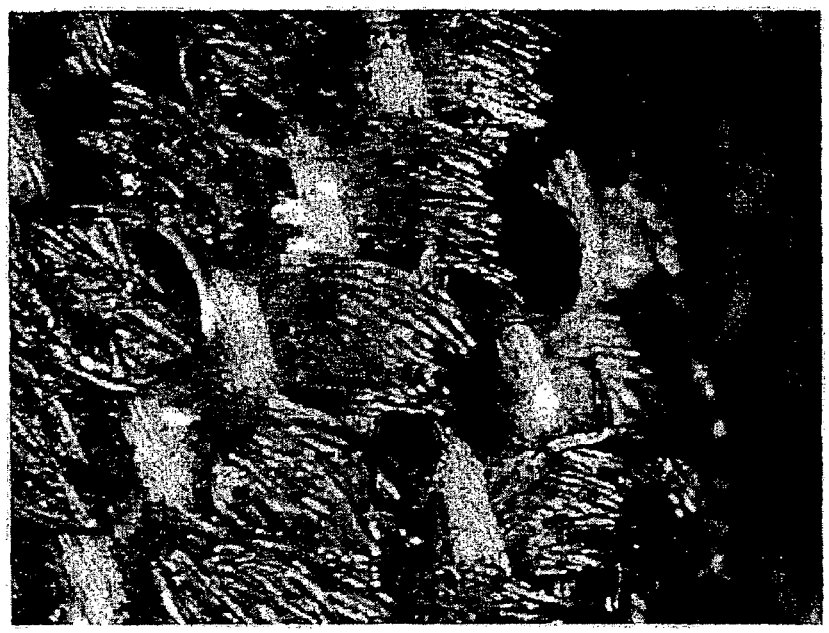
Figure 12:
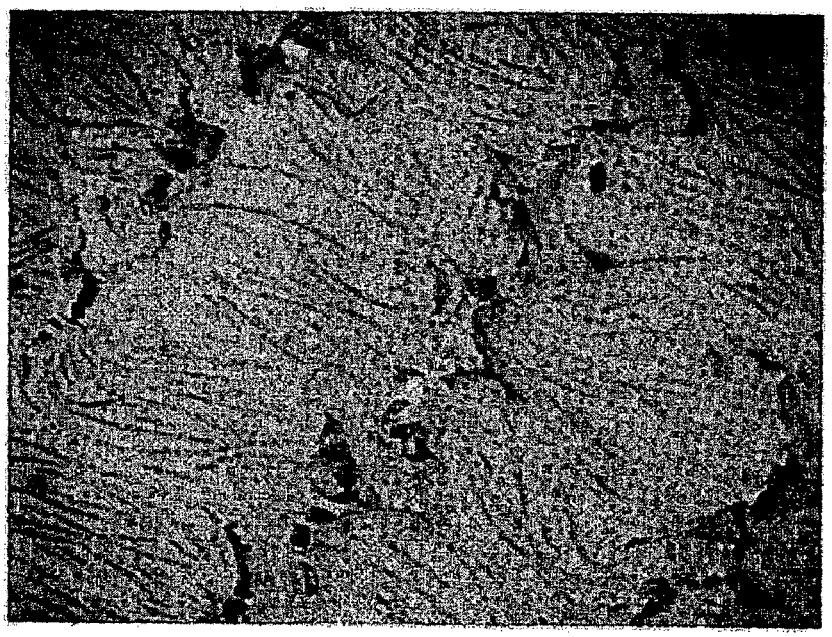

FIGS. 12A and 12B are enlarged photographs of canvases. In particular, FIG. 12A shows a state where the forming yarns is not flat and FIG. 12B shows a state where forming yarns is flat.

Figure 13B:
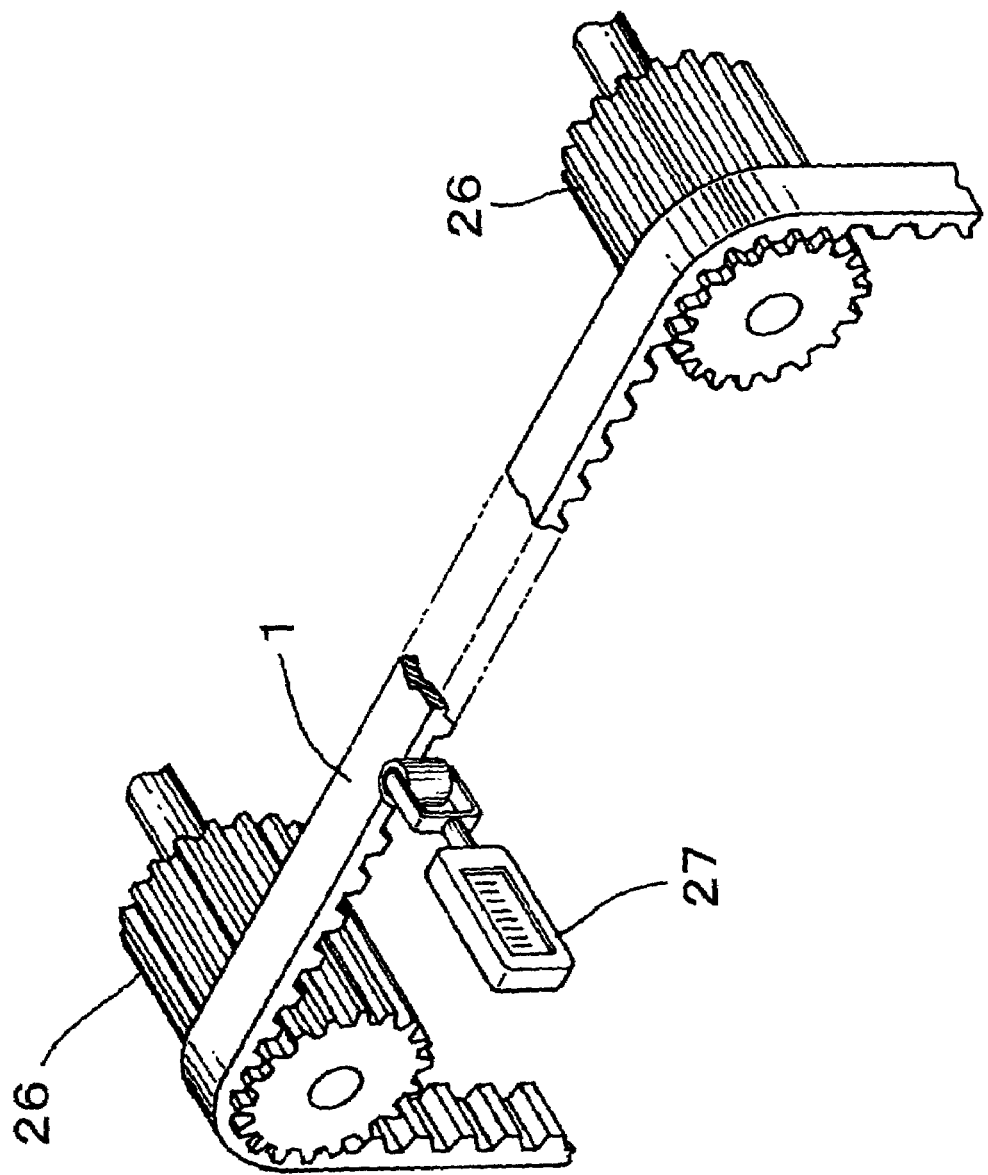
Figure 13:
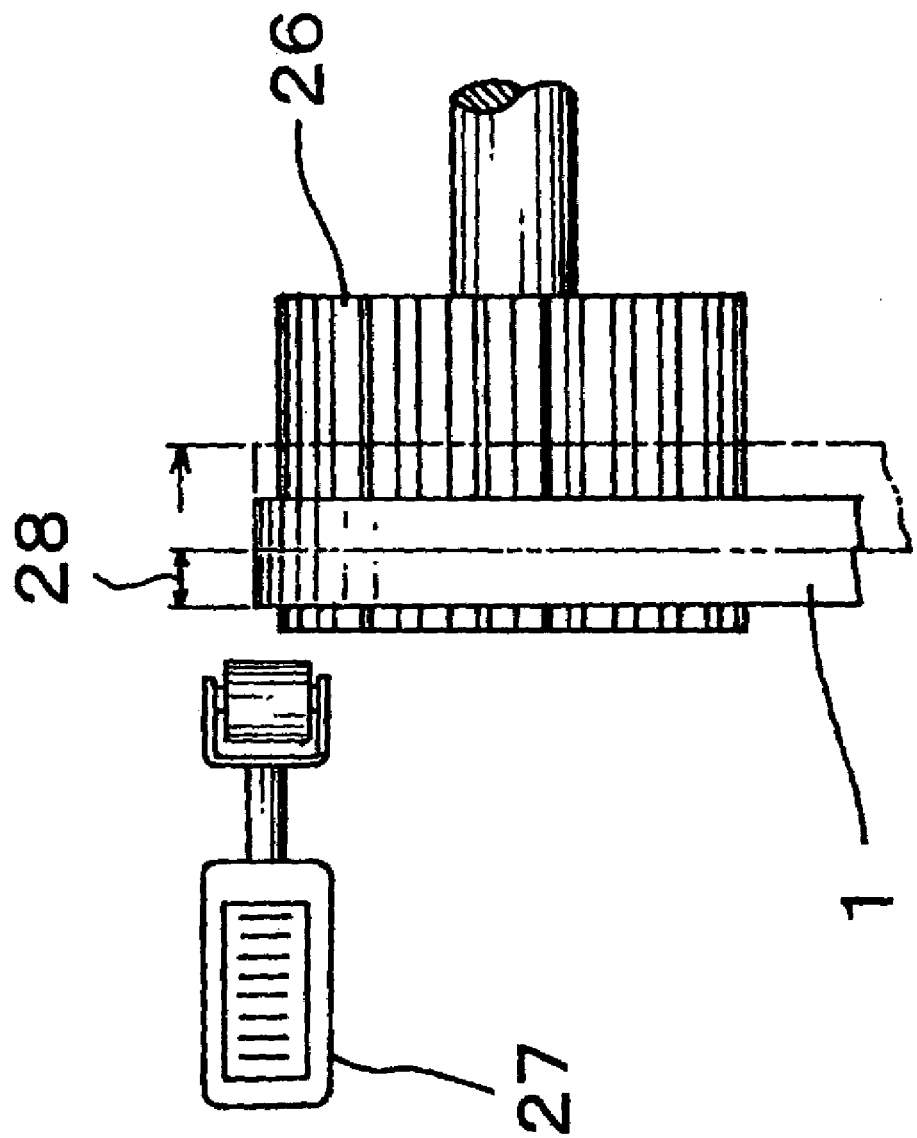

FIGS. 13A, 13B, and 13C show embodiments of side thrust force measurement. In particular, FIG. 13A is a view of a layout, FIG. 13B is a partially cut out schematic perspective view showing an embodiment when a toothed belt is moved while pressing in a longitudinal direction of a pulley, and FIG. 13C is an explanatory view of the movement of the toothed belt. 26 represents a toothed pulley, 27 represents a push-pull gauge, and 28 represents the 5 mm movement of the toothed belt.

DETAILED DESCRIPTION OF THE INVENTION

Conventionally, a toothed belt with a treated tooth cloth is obtained by immediately adhering a rubber dissolved subject to an original canvas and drying it in order to obtain the togetherness and wear resistance of original yarns in the original canvas while ensuring the strength of the treated rubber itself. However, since the rubber composition which is impregnated into the treated tooth cloth is a carbon composition, it is black. As such, black rubber powders or yarns in the treated tooth cloth are released due to friction of the belt with running pulleys and shaving of the belt. Therefore, cleanly running a toothed belt is difficult.

Further, when a rubber composition to which a friction-reducing agent such as polytetrafluoroethylene (PTFE), graphite, silicon or the like is added to lower the friction coefficient of the treated tooth cloth, problems arise such as the decrease in the strength of the treated rubber itself, in its adhesive properties, and the like. These problems lead to the reduced performance of the treated tooth cloth.

Friction reducing agents have poor reactivity, affinity, and reinforcing properties for a compounded or formulated rubber for forming a matrix of a treated composition of a belt body rubber or an original canvas. Additionally, when a large amount of friction reducing agent is formulated to obtain a sufficiently low friction coefficient, the rubber composition itself has a poor togetherness between the yarn filaments which form the canvas due to a large decrease in strength, an increase in temperature dependence, and a decrease in adhesion properties with respect to the original canvas. As such, a large and repeated shearing force is generated and the predetermined service life becomes difficult to maintain due to frictional heat during high speed rotation. Furthermore, when the rubber dissolved substance is simply adhered to the original canvas and the friction reducing agent is only added to a treated rubber inversely, there is an increase release of the rubber powders or yarns of treated tooth cloth as compared to those without the friction reducing agent. Additionally, the effects are also known not to continue for long periods of time under sever conditions of the high speed rotation and high loading. The endurance and the release properties of friction powders also becomes worse.

Figure 4:
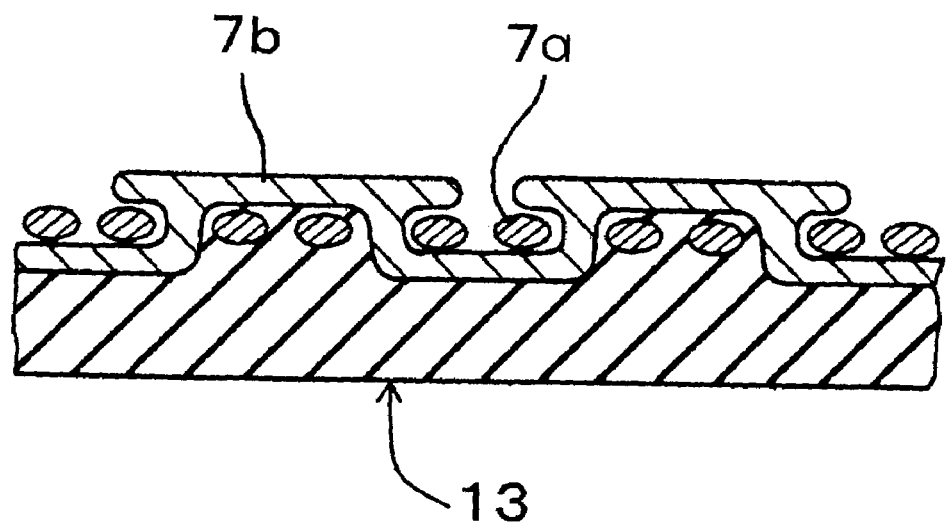
FIG. 4 is an explanatory view in a case where forming yarns of a treated tooth cloth form a flat form. 13 represents the body rubber layer side.
Figure 5:
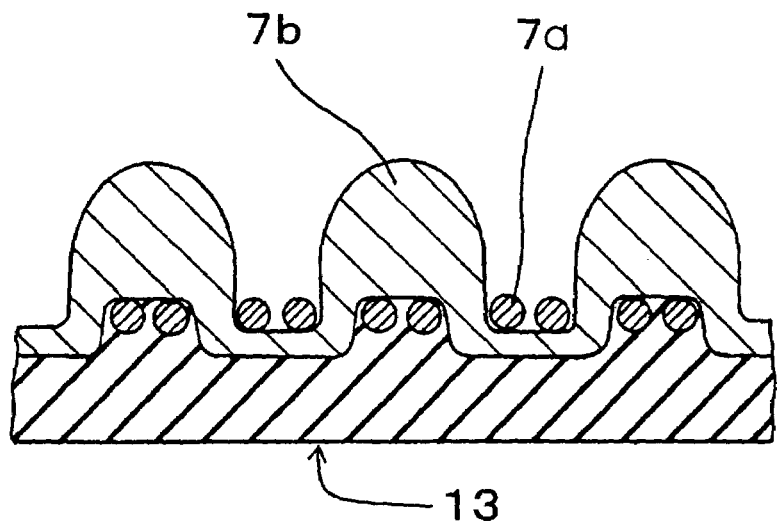
FIG. 5 is an explanatory view in a case where forming yarns of a treated tooth cloth does not form a flat form.

In the manufacture of a conventional toothed belt, a process is often used in which a treated tooth cloth is covered on a mold having a teeth groove shape. A core strand is then wrapped on the obtained structure while applying tension thereto and a rubber is allowed to mold while applying pressure and heat to the rubber with the structure covered by a rubber sheet. In this case, construction yarns, particularly latitudinal yarns or lateral yarns, are vulcanized. The treated tooth cloth exhibits a flat shape with the side of a tooth head portion of a mold and wound core strands with tension in a belt tooth bottom portion (see FIG. 4). On the contrary, construction yarns of treated tooth cloth in belt teeth upper portions and belt teeth side portions are positioned at mold valley portions and are molded by pressing with soft rubber, which flows upon the application of pressure and heat. Accordingly, the shape of the construction yarns of the treated tooth cloth in the belt teeth upper portions and belt teeth side portions is more difficult to be flat as compared with that in the teeth bottom portions (see FIG. 5). Togetherness of filaments of the construction yarns in the belt teeth upper portions and belt teeth side portions are small. Thus the belt teeth upper portions and belt teeth side portions become easily disentangled by repeated friction and bumping or reciprocating motion given by the pulley teeth during belt running for the non-flatness. As a result there is a problem that the togetherness or stability of the filaments is further lowered and the tooth cloth wears due to breaks or fractures of the filament, such that belt tooth cut away is generated.

Further, tooth cloth formation by resorcinol-formalin (formaldehyde)-latex (RFL) treating an original canvas has been performed. However, in this case, since the RFL treatment is a treatment in which friction coefficient is large and temperature dependency is also large, there is a problem that the treatment is weakened in friction and frictional heat generated during high speed rotation and high loading.

Accordingly, the object of the present invention is to solve the problems described above and to provide a toothed belt in which a treated tooth cloth of the toothed belt can be light-colored while maintaining required strength and temperature dependency. Furthermore, a low frictional coefficient can be obtained and maintained with the light-colored belt as well as ensured adhesion properties of the respective layers, long service life of the toothed belt, improvement of stable travel performance, reduction of release of wear powders, judgeability of wear state, and improvement of water resistance can be promoted.

According to the instant invention, adhesion properties between an original canvas and a rubber composition, reduction of temperature dependency, adhesion properties, wear resistance, and high strengthening of a treated rubber layer can be promoted. Furthermore, a treated tooth cloth of the toothed belt can be light-colored while maintaining required strength of the toothed belt and temperature dependency. Additionally, a low frictional coefficient of the toothed belt, long maintenance of the low frictional coefficient, and adhesion properties of the respective layers can be ensured.

Regarding the first layer of the tooth cloth, an improvement of adhesion properties between a rubber composition and an original canvas, promotion of flat shape of construction yarns of the canvas during molding, and obtaining a low frictional coefficient can be performed. Regarding the second rubber layer, a lower frictional coefficient of the layer than that of the first layer can be employed. As to the third layer, strengthening of adhesion between a treated tooth cloth and a belt body rubber layer and prevention of the flow-in of water can be performed. This prevents the seep of the belt body rubber and the third rubber layer to a tooth surface side. As a result, a long service life of the toothed belt, an improvement of stable travel performance, reduction of release of wear powders, judgeability of wear state, and improvement of water resistance can be promoted.

Also according to the present invention, it is possible to color the belt body rubber layer a color other than a black color and/or to color a treated tooth cloth with a color different from the belt body rubber layer. In this case the wear state of the treated tooth cloth can be visually judged. Further, in the case where ethylene-vinyl acetate copolymer (EVA) is formulated into the belt body rubber layer, a toothed belt having high rigidity and excellent wear resistance can be obtained.

Figure 1:
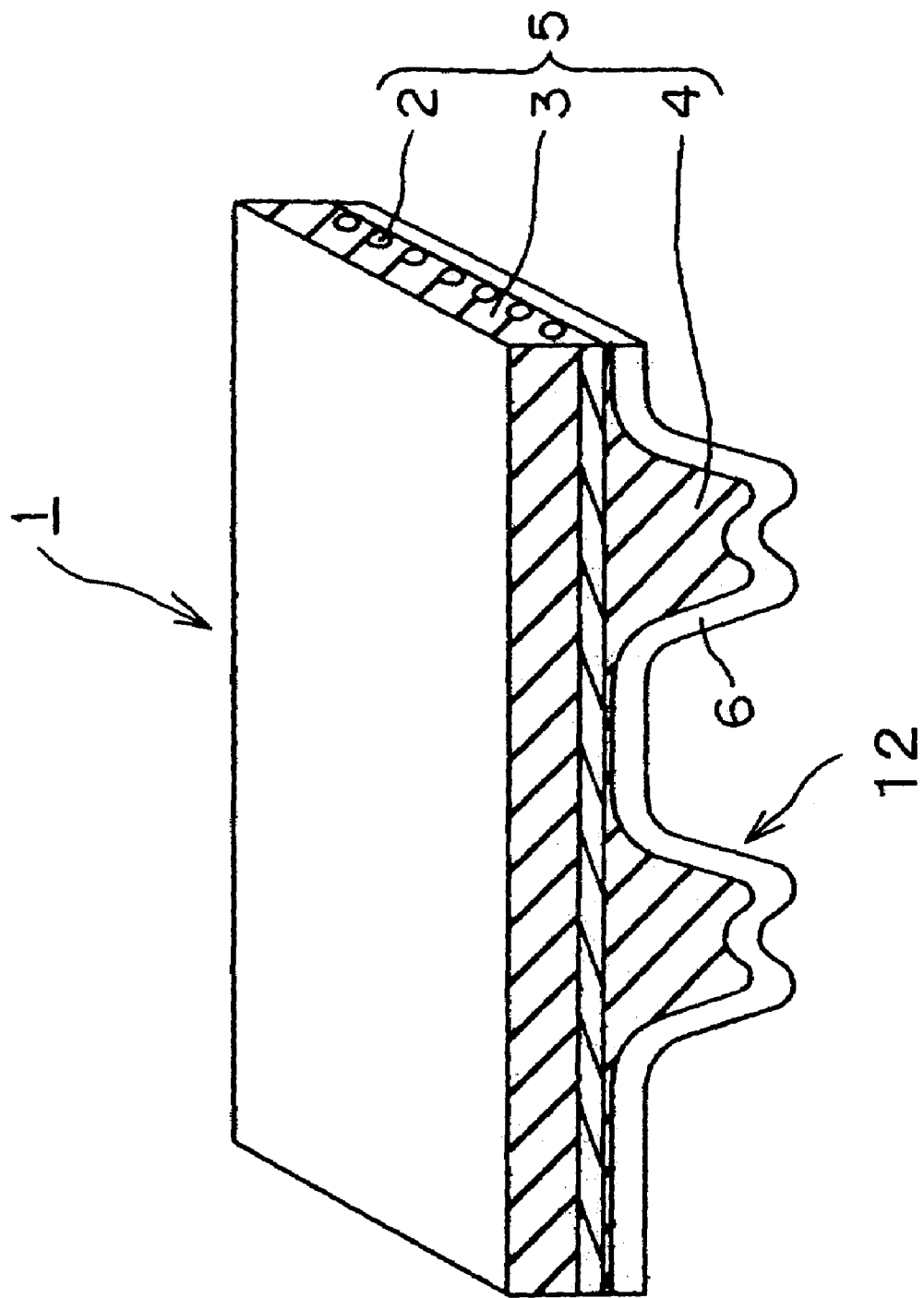
FIG. 1 is a partially cut out cross-sectional perspective view of a toothed belt according to the present invention. 1 represents the toothed belt, 2 represents a core strand, 3 represents the belt body rubber layer, 4 represents a tooth portion, 5 represents the belt body, 6 represents the treated tooth cloth, and 12 represents the pulley surface side.
Figure 2:
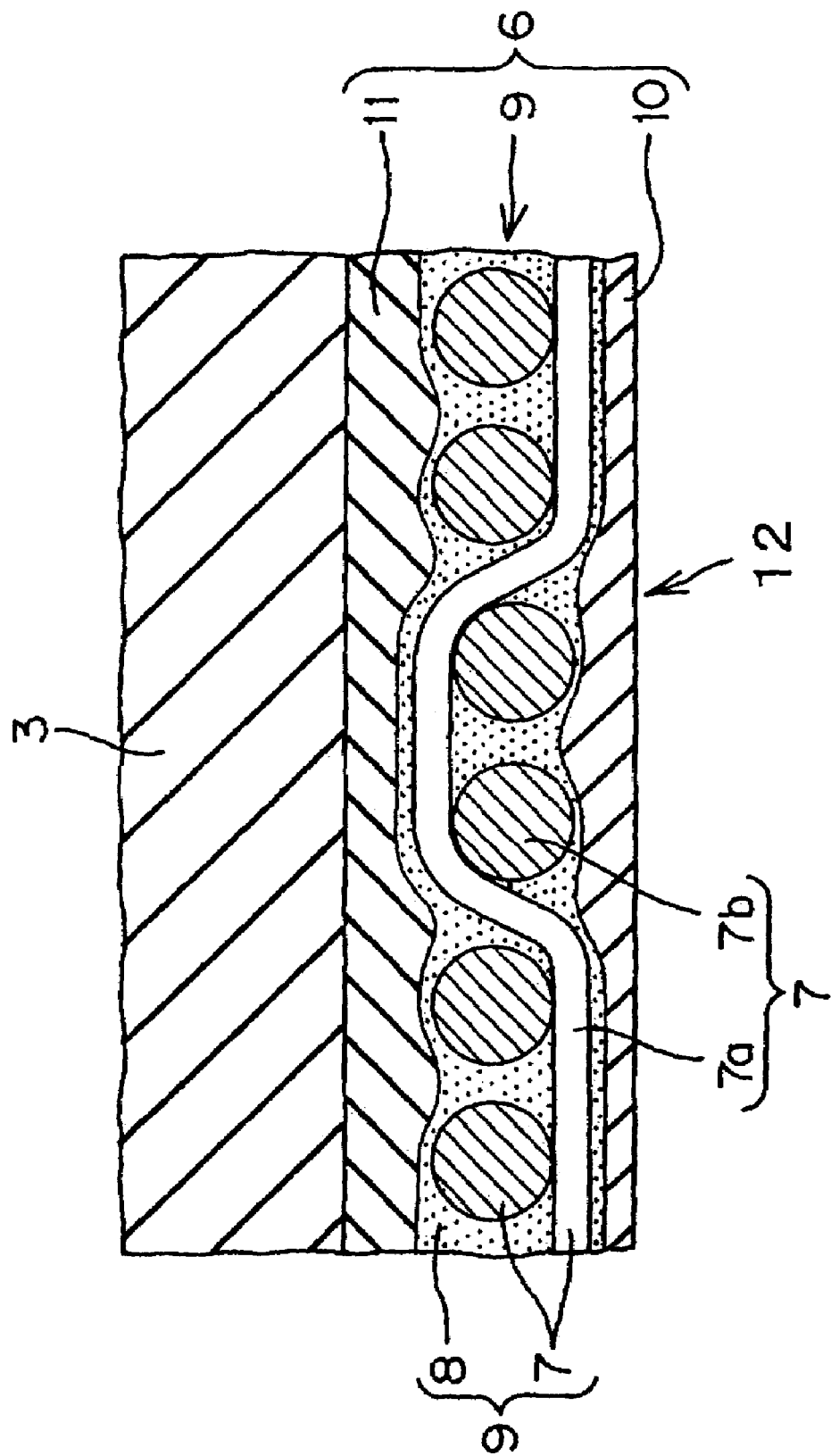
FIG. 2 is an enlarged cross-sectional view of a principal portion in the toothed belt. 7 represents the original canvas, 7a represents a longitudinal yarn, 7b represents a latitudinal yarn, 8 represents a rubber composition, 9 represents the first layer, 10 represents the second rubber layer, 11 represents the third rubber layer, and 12 represents the pulley surface side.
Figure 3:
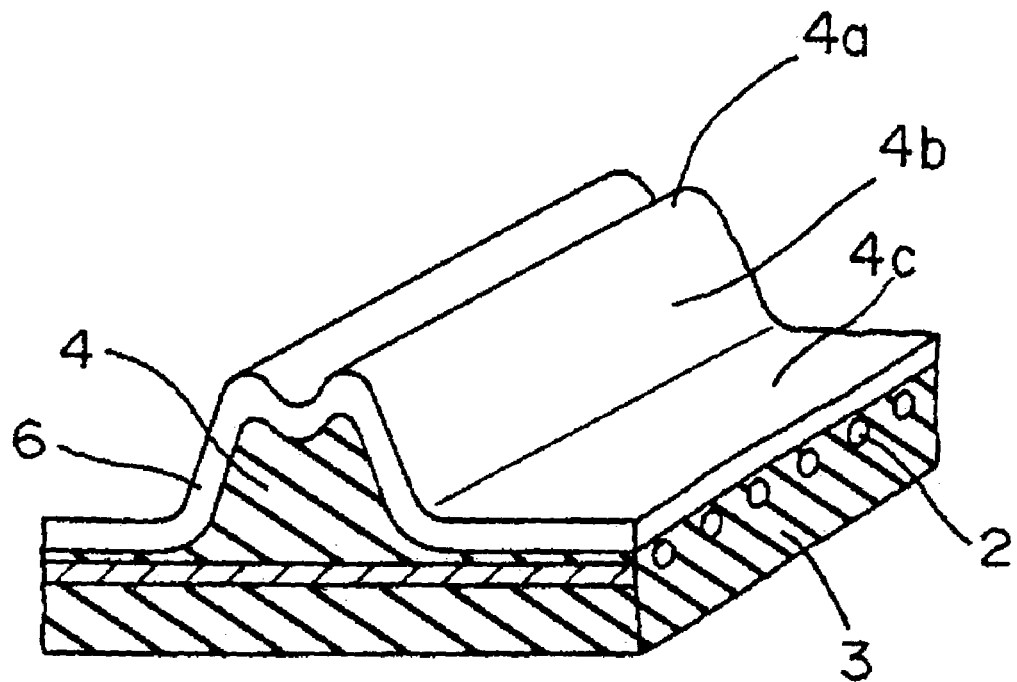
FIG. 3 is a partially cut out schematic view of the toothed belt. 4a represents the tooth top portion, 4b represents the tooth side portion, and 4c represents the tooth bottom portion.

A toothed belt 1 according to the present invention is shown in FIGS. 1 and 2. FIG. 1 is a partially cut-out, cross-sectional perspective view of the toothed belt 1. FIG. 2 is an enlarged cross-sectional view of a main portion of the toothed belt 1. The toothed belt 1 is constructed by a process, in which a plurality of teeth portions 4 are formed on a surface of a belt body rubber layer 3 in which a plurality of core strands 2 are buried in the longitudinal direction of the belt. A treated tooth cloth 6 is coated on the surface of the teeth portions 4 of the belt body rubber layer 3. This toothed belt may be formed by forming teeth portions 4 on both sides of the belt body rubber layer 3. It is noted that FIG. 3 shows a partially cut out schematic view of the toothed belt. The reference numeral 4a denotes a tooth upper portion, the reference numeral 4b denotes a tooth side portion, and the reference numeral 4c denotes a tooth bottom portion.

The above-mentioned core strand 2 can be, for example, a synthetic fiber cord in which an adhesive (for example, RFL liquid, whose latex (L) is hydrogenated nitrile rubber (HNBR)) is impregnated into multifilament yarns such as polyamide fibers, aramide fibers, polyester fibers or the like, or a glass cord in which an adhesive (for example, RFL liquid, whose latex (L) is HNBR) is impregnated into multifilament yarns such as E glass fibers, high strength glass fibers or the like.

A treated tooth cloth 6 is comprised of a first layer 9 in which a rubber composition 8 is impregnated into original canvases 7 (rubber-impregnated canvas layer), a second rubber layer (surface rubber layer) 10 formed on a surface side of the first layer 9 and in direct contact with a toothed pulley, and a third rubber layer (adhesive rubber) 11 formed on the back side of the first layer and adhered to the belt body rubber layer 3.

The original canvas 7 is woven with at least one longitudinal yarn 7a and at least one latitudinal yarn 7b, which may be construction yarns such as, for example, nylon 6, nylon 66, an aramide fiber, a poly-para-phenylene benzoxazole fiber singly, or of their mixed synthetic yarn.

The toothed belt 1 may be manufactured by the following exemplary method. The treated tooth cloth 6 is wound around a mold having a teeth grooves shape so that a second rubber layer 10 is brought entirely into contact with the treated tooth cloth 6. Then a core strand 2 is wound on the structure spirally and a non-vulcanized rubber sheet, which will be a belt body rubber layer 3, is wound thereon. Subsequently, the obtained structure is placed into a vulcanizing can and is pressurized from the outer peripheral side and heated with vapor. Then, in the toothed belt 1, the rubber is softened by pressurization and heating whereby teeth portions 4 are formed and the treated tooth cloth 6 is adhered to the belt body rubber layer 3 and vulcanized so that a cylindrical mold form is formed. The cylindrical mold form is then cut into circular slices to manufacture the toothed belt 1. In this case, when a coloring agent other than black is formulated into a rubber composition forming the respective layers of the treated tooth cloth 6, a surface of the teeth portions 4 of the toothed belt 1 is colored with colors other than black.

The following examples describe illustrative methods of practicing the instant invention and are not intended to limit the scope of the invention in any way.

EXAMPLE 1

Third Rubber Layer

The third rubber layer (adhesive rubber layer) 11 is described hereinbelow. A list of the rubber compositions used in the third rubber layer 11 is provided in Table 1. It is noted that the formulations A1 and A12 are comparative examples in Table 1 and formulations A2 to A11 are examples of the present invention.

TABLE 1

Rubber Components of the Third Layer

| | Formulation No. | | | | | |
|---|---|---|---|---|---|---|
| | A1 | A2 | A3 | A4 | A5 | A6 |
| Zetpol 2020 (1) | 100 | 90 | 90 | 90 | 90 | 90 |
| ZSC2295N (2) | — | 10 | 10 | 10 | 10 | 10 |
| HAF carbon | 40 | — | — | — | — | — |
| Titanium oxide | — | 10 | 10 | 10 | 10 | 10 |
| Silica (3) | — | 10 | 10 | 20 | 30 | — |
| Hydrophobic silica (4) | — | — | — | — | — | 10 |
| Sulfur | 0.5 | — | — | — | — | — |
| Perkadox 14/40C (5) | — | 5 | 5 | 5 | 5 | 5 |
| Zinc oxide | 5 | — | — | — | — | — |
| Stearic acid | 1 | — | — | — | — | — |
| RS700 (6) | 3 | — | — | — | — | — |
| Nocrac CD (7) | 2 | — | — | — | — | — |
| Nocceler TT-P (8) | 1.5 | — | — | — | — | — |
| Nocceler CZ-G (9) | 0.5 | — | — | — | — | — |
| Vulnoc PM-P (10) | — | 0.5 | 0.5 | 0.5 | 0.5 | 0.5 |
| Desmodule RE (11) | 23.5 | 23.5 | — | — | — | — |
| Phenol resin (12) | — | — | 10 | 10 | 10 | 10 |

| | Formulation No. | | | | | |
|---|---|---|---|---|---|---|
| | A7 | A8 | A9 | A10 | A11 | A12 |
| Zetpol 2020 (1) | 90 | 90 | 90 | 90 | 90 | 70 |
| ZSC2295N (2) | 10 | 10 | 10 | 10 | 10 | 30 |
| HAF carbon | — | — | — | — | — | — |
| Titanium oxide | 10 | 10 | 10 | 10 | 10 | 10 |
| Silica (3) | — | — | — | — | — | — |
| Hydrophobic silica (4) | 20 | 30 | 20 | 20 | 20 | 20 |
| Sulfur | — | — | — | — | — | — |
| Perkadox 14/40C (5) | 5 | 5 | 5 | 5 | 5 | 5 |
| Zinc oxide | — | — | — | — | — | — |
| Stearic acid | — | — | — | — | — | — |
| RS700 (6) | — | — | — | — | — | — |
| Nocrac CD (7) | — | — | — | — | — | — |
| Nocceler TT-P (8) | — | — | — | — | — | — |
| Nocceler CZ-G (9) | — | — | — | — | — | — |
| Vulnoc PM-P (10) | 0.5 | 0.5 | 0.5 | 0.5 | 0.5 | 0.5 |

TABLE 1-continued

Rubber Components of the Third Layer

| Desmodule RE (11) | — | — | — | — | — | — |
|---|---|---|---|---|---|---|
| Phenol resin (12) | 10 | 10 | 20 | 30 | 40 | 20 |

(1) Produced by Nippon Zeon Co., Ltd. Iodine value 28 mg/100 mg HNBR of an amount of combined acrylonitrile of 36.2%
(2) Produced by Nippon Zeon Co., Ltd. Polymer alloy obtained by finely distributing zinc methacrylate into base lolymer ZP2020
(3) Produced by Nihon Silica Co., Ltd.
(4) Produced by Nihon Silica Co., Ltd.
(5) Produced by Kayaku Akzo Co., Ltd. Organic peroxide crosslinking agent (di-tert-butyl perozidiisopropil benzene)
(6) Produced by Asahi Denka Kogyo Co., Ltd.
(7) Produced by Ohuch Shinko Chemical Co., Ltd.
(8) Produced by Ohuch Shinko Chemical Co., Ltd.
(9) Produced by Ohuch Shinko Chemical Co., Ltd.
(10) Produced by Ohuch Shinko Chemical Co., Ltd.
(11) Produced by Bayer Co., Ltd. Ethyl Acetate nitrile phenyl, dissolved by 15% methane tri-isocyanate
(12) Produced by Sumitomo Durez Company, Ltd.

To measure the adhesion strength of the rubber composition shown in Table 1 an adhesion test (peeling test) wherein the rubber composition is adhered to a rubber layer corresponding to a core strand-buried belt body rubber layer, was performed. The rubber components to be adhered (corresponding to a belt body rubber) are shown in. Table 2. The original canvas and the core strand are as follows:
 Canvas: material: Nylon 66; Latitudinal yarn: 210 d×2; Longitudinal yarn: 210 d Twill.
 Core strand: material: K glass; Construction 3/13; Core strand adhesive layer treatment: RFL; Overcoat treatment: present.

TABLE 2

Components of Rubber to be Adhered

| | Formulation No. E1 |
|---|---|
| Zetpol 2020 | 35 |
| ZSC2295N | 65 |
| SRF Carbon | 20 |
| Perkadox 14/40C | 7 |
| Vulnoc PM-P | 1 |
| Nowguard 445 (13) | 1.5 |
| Suntight 5 (14) | 0.5 |
| Sulfur | 0.2 |

(13) Produced by Uniroyal Chem Co., Ltd. Substituted diphenylamine
(14) Produced by Seiko Chem. Co., Ltd. Special Wax Samples are prepared as follows and as shown in FIGS. 6 and 7. Specifically, formulated rubbers of formulations A1 to A12 are dissolved into a mixed solvent of toluene and methyl ethyl ketone while controlling concentrations of the mixture so that the viscosity at a temperature near room temperature is 9000 to 10000 CP. Then the obtained mixture is spread on the above-mentioned nylon canvas with a glass bar and dried. The mixture is adhered to the nylon canvas so that the amount of adhesion of the dried composition is 100 g per 1 m$^2$ of the canvas. Then the obtained structure is joined to a rubber to be adhered (formulation E1 shown in Table 2) and is vulcanized with a press at 160° C. for 30 minutes. The obtained structure is used as a sample having a width of 20 cm, a length of 200 mm and a thickness of 8 mm. As shown in FIG. 8, adhesion tests of the respective treated tooth cloths were made with a tensile strength tester using these samples. The test results are shown in Table 3. It is noted that a hot adhesion test (120° C. for 20 minutes) is carried out by placing samples into a 120° C. constant-temperature bath and leaving it for 20 minutes to measure peel strength. Further, watertight adhesion tests (80° C. for 168 hours) were carried out by immersing the respective samples in 80° C. hot water and taking them out after 168 hours to measure adhesion strength.

TABLE 3

Peel Strength (Unit: N)

| | Formulation No. | | | | | |
|---|---|---|---|---|---|---|
| | A1 | A2 | A3 | A4 | A5 | A6 |
| Ordinal condition | 163 | 78 | 214 | 230 | 195 | 225 |
| Hot condition | 73 | 25 | 148 | 152 | 149 | 157 |
| Water resistance | 32 | 39 | 66 | 41 | 33 | 105 |

| | Formulation No. | | | | | |
|---|---|---|---|---|---|---|
| | A7 | A8 | A9 | A10 | A11 | A12 |
| Ordinal condition | 240 | 206 | 235 | 255 | Rubber break | 190 |
| Hot condition | 161 | 152 | 125 | 113 | 99 | 91 |
| Water resistance | 163 | 155 | 123 | 107 | 73 | 104 |

First, adhesion properties between a third rubber layer (adhesive rubber layer) and a belt body rubber layer were examined. Important characteristics of the third rubber layer include large adhesion properties between the body rubber layer, core strands and treated canvases, small temperature dependency, and high water resistance. Regarding ordinal (i.e., at ordinal temperature) adhesion strength, comparative evaluations between a polyisocyanate type adhesive and a phenolic adhesive, which is usually used in adhesion between fiber and rubber, were performed. A polyisocyanate type adhesion treatment (A2) in the example of the present invention led to only half or less of the adhesive strength as compared with a HNBR-carbon-sulfur rubber+polyisocyanate type adhesion treatment (A1), which is a comparative reference. This is common to a case where the polyisocyanate type adhesive is formulated to a peroxide crosslinking rubber without ZSC. It is considered that the polyisocyanate type adhesive has a mechanism that polymer active hydrogen is drawn by high polarity and reactivity of the isocyanate group and primarily bond is performed to adhere. On the other hand, in the case of the peroxide crosslinking rubber, it is considered that a reaction due to drawing of active hydrogen from polymer by radical generation of the peroxide, that crosslinking of polymers is preferentially carried out. Thus, in this case, if there is no idea in the formulation to use any method (crosslinking speed of a rubber to be adhered should be reduced or the like) and polyisocyanate is only formulated as a part of a rubber, the adhesion between a ZSC formulated rubber and a polyisocyanate type adhesive may be difficult.

On the other hand, it is considered that in a phenol, resin a body rubber side is reacted with an HNBR nitrile group and, regarding a canvas side that is nylon 66, high compatibility and strong adhesion properties obtained by primarily bonding with an amino group of hexanathylenediamine were exhibited. However, as the amount of the phenol resin is increased, the adhesion strength was proportionally increased at a temperature near the ordinal temperature. However, at a hot temperature (in atmosphere of 120° C.) a decrease of adhesion was found from a portion near 30 parts by weight. It is considered that on the contrary to the case of the isocyanate adhesive reaction is preferentially performed and a decrease in crosslinking density of polymers is generated and the temperature dependency of the adhesive layer is increased. In this case, since a phenol resin, which is novolak, is used, the decrease in the crosslinking density is greatly influenced by significantly exhibiting thermoplasticity for non-reacted resin. Further, such a test that a methylene group donor such as hexamethylene tetramine or the like is added to them to make a thermosetting type was performed. However, since a decrease in the adhesive force is large, satisfied performance was not obtained in this formulation case.

Thus, it seems that an improvement of water resistance is due to a decrease in crosslinking density and because water is drawn more by an increased phenol resin having high hydrophilic property so that swelling properties are increased. In this case, all things considered, 20 parts by weight became suitable as an amount of formulation of the phenol resin. Further, it is considered that the decrease of the adhesion strength by increasing the amount of formulation of ZSC (zinc methacrylate) is because HNBR, which is a part of the polymer for ZSC contained adhesive layer, is decreased and that the amount of nitrile group, which is a reaction component, is also reduced. Thus, the adhesion properties are liable to decrease.

The effects of the silica formulation were not so exhibited in difference between the hydrophilic property and hydrophobic property at ordinal and hot conditions. However, in water resistance, a large effect was found by use of hydrophobic silica. However, when 20 parts by weight or more are formulated, the adhesion properties decrease at ordinal conditions so that reduction rate of adhesive strength is liable to decrease at a water resistance test. Since the initial adhesive force is reduced, an increased amount of the hydrophobic silica is considered to be suitable. Furthermore, a formulation of the silica system significantly increases the viscosity at the time of non-vulcanization. Thus, too much of the silica can affect moldability of a belt and a suitable amount of formulation is required.

Regarding a formulated treated product (formulation 7) of canvas having good adhesion results as the test results of the third rubber layer (adhesive rubber layer) and a reference formulated treated product (formulation A1), comparisons of adhesion properties between the respective products and a core strand were made. The test method is as follows. Core strands are placed in a mold at gaps of 5 mm and the above-mentioned treated tooth cloth is placed thereon. Then a 3.0 mm thick rubber sheet for adhesion test was placed on the structure and they were vulcanized with a press at 160° C. for 30 minutes and adhered to each other. Then, the obtained structure was molded in a structure having a width of 150 mm, a length of 200 mm and a thickness of 2 mm, and samples were formed by break or fracture the obtained article into 20 mm wide strips (see FIG. 9). This sample was applied to a circular jig and a core strand was peeled with a tensile strength tester so that peel strength between a rubber of the third rubber layer and the core strand was measured (see FIG. 10). The test results are shown in Table 4.

TABLE 4

Peel Strength (Unit: N)

| | Formulation No. | |
|---|---|---|
| | A1 | A7 |
| Sample | A1 treated canvas | A7 treated canvas |
| Ordinal conditions | 15.4 | 23.1 |
| Hot conditions | 10.1 | 18.5 |
| Water resistance | 3.5 | 10.4 |

Core strand; K glass 3/13, RFL+overcoat (Chemlok 402), produced by NGF

Hot peel tests were made by placing samples into a 120° C. constant-temperature bath, leaving them for 20 minutes, and measuring peel strengths of the obtained samples. Watertight peel tests were made by immersing samples in 160° C. hot water, taking them out after 168 hours, and measuring their peel strengths. The samples (formulation A7) were superior to the reference formulated treated products (formulation A1) under all ordinal, hot, and watertight conditions. An adhesive layer, as an overcoat layer, is applied onto the outermost layer of the core strand. The principal component of the adhesive layer is a polyisocyanate type adhesive. In combination with the formulation A7, it is considered that a phenol resin component contained in the composition and an isocyanate component in the overcoat layer lead to the reaction of phenol and isocyanate. That is, urethane bond and urea bond other components than bond when only polymer such as A1 is added so that the peel strengths of samples of A7 are improved. Further, regarding the water resistance, a decrease in peel strength is very small from effects of hydrophobic silica and the above-mentioned bonds and peroxide crosslinking. In a toothed belt, the decrease in peel strength becomes significantly small with respect to water flowing from the canvas side to the core strand side.

EXAMPLE 2

First Rubber Layer

The first layer (rubber-impregnated canvas layer) 9 is described hereinbelow. A list of rubber compositions used in the first layer 9, which occupies the central portion of the treated tooth cloth 6, is provide in Table 5. It is noted that in Table 5, the formulations B1 to B7 and B11 are comparative examples, and the formulations B8 to B10 are examples of the present invention. Comments (1) to (14) are as described above.

TABLE 5

Rubber Components of the First Layer

| | Formulation No. | | | | |
|---|---|---|---|---|---|
| | B1 | B2 | B3 | B4 | B5 |
| Zetpol2020 (1) | 100 | 90 | 90 | 90 | 90 |
| ZSC2295N (2) | — | 10 | 10 | 10 | 10 |
| HAF carbon | 40 | — | — | — | — |
| Titanium oxide | — | 10 | 10 | 10 | 10 |
| Silica (3) | — | — | — | — | — |
| Hydrophobic silica (4) | — | 20 | — | — | — |
| Sulfur | 0.5 | — | — | — | — |
| Perkadox 14/40C (5) | — | 5 | 15 | 15 | 15 |
| Zinc oxide | 5 | — | — | — | — |
| Stearic acid | 1 | — | — | — | — |
| RS700 (6) | 3 | — | — | — | — |
| Nocrac CD (7) | 2 | — | — | — | — |
| Nocceler TT-P (8) | 1.5 | — | — | — | — |
| Nocceler CZ-G (9) | 0.5 | — | — | — | — |
| Vulnoc PM-P (10) | — | 0.5 | 0.5 | 0.5 | 0.5 |
| Desmodule RE (11) | 23.5 | — | — | — | — |
| Phenol resin (12) | — | 10 | 10 | 10 | 10 |
| PTFE (13) | — | — | — | — | — |
| Potassium titanate fiber (14) | — | — | — | — | — |
| Zinc methacrylate (15) | — | — | 10 | 20 | 30 |
| Nocceler TET-G (16) | — | — | 1 | 1 | 1 |

TABLE 5-continued

Rubber Components of the First Layer

| | Formulation No. | | | | | |
|---|---|---|---|---|---|---|
| | B6 | B7 | B8 | B9 | B10 | B11 |
| Zetpol2020 (1) | 90 | 90 | 90 | 90 | 90 | 90 |
| ZSC2295N (2) | 10 | 10 | 10 | 10 | 10 | 10 |
| HAF carbon | — | — | — | — | — | — |
| Titanium oxide | 10 | 10 | 10 | 10 | 10 | 10 |
| Silica (3) | — | — | — | — | — | — |
| Hydrophobic silica (4) | — | — | — | — | — | — |
| Sulfur | — | — | — | — | — | — |
| Perkadox 14/40C (5) | 15 | 15 | 15 | 15 | 15 | 5 |
| Zinc oxide | — | — | — | — | — | — |
| Stearic acid | — | — | — | — | — | — |
| RS700 (6) | — | — | — | — | — | — |
| Nocrac CD (7) | — | — | — | — | — | — |
| Nocceler TT-P (8) | — | — | — | — | — | — |
| Nocceler CZ-G (9) | — | — | — | — | — | — |
| Vulnoc PM-P (10) | 0.5 | 0.5 | 0.5 | 0.5 | 0.5 | 0.5 |
| Desmodule RE (11) | — | — | — | — | — | — |
| Phenol resin (12) | 10 | 10 | 10 | 10 | 10 | 10 |
| PTFE (13) | — | — | 40 | 80 | 120 | 80 |
| Potassium titanate fiber (14) | 5 | 10 | 5 | 5 | 5 | 5 |
| Zinc methacrylate (15) | 20 | 20 | 20 | 20 | 20 | 20 |
| Nocceler TET-G (16) | 1 | 1 | 1 | 1 | 1 | 1 |

(15) Produced by Asada chemical Co., Ltd. Zinc methacrylate R-20S
(16) Produced by Ohuch Shinko Chemical Co., Ltd. TETD Nocceler TET-G
B1: Conventional treatment;
B2: Same formulation as in third layer;
B3-B5: Effect of change of zinc methacrylate;
B6 and B7: Effect of potassium titanate;
B8-B10: Effect of PTFE;
B11: Effect of cross-linking agent Characteristics required for the first layer (rubber-impregnated canvas layer) include adhesion properties, flattening of the canvas construction yarns, a decrease in frictional coefficient, and improvement of wear resistance. To measure the rubber compositions shown in FIG. 5, they were vulcanized with a rubber to be adhered at the same conditions as in the third rubber layer, adhered thereto, and peel tests were subsequently performed. Results of the peel tests under ordinal conditions (at room temperature of 23° C.) are shown in Table 6. Then the respective formulated products were dissolved into a mixed solvent of toluene and methyl ethyl ketone while controlling the concentration so that the viscosity of the mixtures is 600 to 1200 CP. Nylon canvases were immersed into the obtained products and then the gaps of the structures were controlled by drawing rolls. The obtained products were impregnated to the canvases so that the amount of adhesion of the respective products to the canvas is in a range of 30% to 35%. The third rubber layer treated rubber (Formulation B1 was treated by A1 treatment and formulations B2 to B11 were treated by A7 treatment) was spread on the impregnated products and dried. After drying, the impregnated products were adhered to the canvas in an adhesion amount of 100 g per 1 m². The obtained structures were used as the respective treated canvases for tests.

TABLE 6

Peel Strength (Unit: N)

| | \multicolumn{6}{c}{Tooth cloth No.} | | | | | |
|---|---|---|---|---|---|---|
| | K1 | K2 | K3 | K4 | K5 | K6 |
| 3rd layer formulation No. | A1 | A7 | ← | ← | ← | ← |
| 1st layer formulation No. | B1 (A1) | B2 (A7) | B3 | B4 | B5 | B6 |
| Peel strength(N) | 199 | Rubber break | 244 | 189 | 140 | 260 |

| | \multicolumn{5}{c}{Tooth cloth No.} | | | | |
|---|---|---|---|---|---|
| | K7 | K8 | K9 | K10 | K11 |
| 3rd layer formulation No. | ← | ← | ← | ← | ← |
| 1st layer formulation No. | B7 | B8 | B9 | B10 | B11 |
| Peel strength (N) | 262 | 239 | 210 | 140 | 257 |

A1 is same formulation as B1
A7 is same formulation as B2

A treated canvas in which a rubber component shown in Table 5 is impregnated into an original canvas was combined with a belt body rubber and core strands so that they could be subjected to a toothed belt process under the same conditions. The obtained toothed belt was also trained around a driving pulley and a driven pulley and subjected to a high load endurance test. The results are shown in Table 7 under the following conditions:

Belt body rubber: Rubber to be adhered shown in Table 2.
Core strand: E glass—3/13; overcoat: coat layer is present.
Tooth pitch: 8 mm, Number of links: 125, Width: 25 mm.
Number of pulley teeth: 30 T-30 T, Rotating speed: 3000 r/m, Mounting tension 382 N
Load torque 80.3 N·m.
Atmospheric temperature (24 to 26° C.).

TABLE 7

High Load Endurance Test

| Tooth belt No. | L1 | L2 | L3 | L4 | L5 | L6 |
|---|---|---|---|---|---|---|
| Tooth cloth No. | K1 | K2 | K3 | K4 | K5 | K6 |
| Downtime (hours) | 125 | 69 | 74 | 101 | 87 | 136 |
| Tooth belt No. | L7 | L8 | L9 | L10 | L11 | |
| Tooth cloth No. | K7 | K8 | K9 | K10 | K11 | |
| Downtime (hours) | 129 | 153 | 198 | 160 | 167 | |

L1: Conventional treatment;
L2: Same formulation as in third layer;
L3-L5: Effect of change of zinc methacrylate;
L6 and L7: Effect of potassium titanate;
L8-L10: Effect of PTFE;
L12: Effect of crosslinking agent.

EXAMPLE 3

Tooth Cloth

The flatness of a treated tooth cloth forming yarn is discussed hereinbelow. When a load is applied constantly, a position in a tooth surface of a toothed belt where wear is generated is usually a tooth side portion (see FIG. 3 with regard to the tooth side portion). The wear of the flatness of latitudinal yarns of the tooth side portion is important. Since the quantification of the flatness is difficult, a depth from a belt tooth bottom portion to the top portion of the belt tooth is read with a constant load-applied depth gauge. A height in moldability is defined as flatness of the forming yarns. That is a canvas which does not exhibit flatness of the forming yarns is in a state where latitudinal yarns are protruded by a part in which the thickness of the canvas is not flattened. Thus, when a constant load is applied the protrusion is liable to be deformed so that a height from the tooth bottom to the tooth head is reduced. Here, differences between values obtained when a depth gauge is placed lightly and values obtained when a load of 1000 g is applied to the depth gauge are compared with each other, and large difference means non-flatness of the forming yarns.

FIG. 11 shows an embodiment in which a depth from a tooth top portion to a tooth bottom portion of a toothed belt is measured with a depth gauge. FIGS. 12A and 12B show enlarged photos of a canvas of a tooth side portion. Particularly, FIG. 12A shows a state where forming yarns of a RFL canvas has no flatness and FIG. 12B shows a state where forming yarns of a canvas according to the present invention have flatness and are soft. Data of differences obtained with the depth gauge are shown in Table 8.

TABLE 8

| Tooth belt No. | L1 | L2 | L3 | L4 | L5 | L6 |
|---|---|---|---|---|---|---|
| Tooth cloth No. | K1 | K2 | K3 | K4 | K5 | K6 |
| Difference (mm) | 0.12 | 0.17 | 0.10 | 0.09 | 0.09 | 0.10 |
| Tooth belt No. | L7 | L8 | L9 | L10 | L11 | |
| Tooth cloth No. | K7 | K8 | K9 | K10 | K11 | |
| Difference (mm) | 0.12 | 0.10 | 0.11 | 0.13 | 0.10 | |

A sample in which formulation A7 (the same as formulation B2) has the best result in the test of the third rubber layer (adhesive rubber layer) is used as a first layer (rubber-impregnated treatment) exhibited strength into rubber break in peel strength. However, the sample has the shortest endurance in a toothed belt. This is because a large amount of hydrophobic silica is formulated in the sample, the frictional coefficient is increased so that friction with a pulley contact surface becomes large and fluidity becomes worse due to treatment. Whereby moldability of a treated tooth cloth becomes worse and the flatness of forming yarns are not exhibited (L2), resulting in that there is no endurance although adhesion properties of adhering with a body rubber and an original canvas are excellent.

Further, in formulations B3 to B5 in which an amount of zinc methacrylate is increased, adhesion properties with respect to a belt body rubber are low, endurance time is the best in formulation of 20 parts by weight. Further, an increase in adhesive force and an improvement of endurance by formulating a potassium titanate fiber in the samples by 5 to 10 parts by weight (B6, B7) are obtained. Further, the zinc methacrylate has an effect of inner lubrication and improves wear resistance of a rubber portion, which a matrix of a treated layer, so that it improves the moldability of the treated tooth cloth and significantly contributes to the securing of flatness of forming yarns (see B3 to B5). It is considered that formulation of a potassium titanate fiber of 10 parts by weight or more increases an increase in viscosity of a treated compound. Thus the flatness of forming yarns so that togetherness of filaments of forming yarns is lowered by releasing and tapping due to loads repeatedly applied during a belt travel so that the release of the togetherness of the forming yarns is further increased thereby decreasing endurance.

Polytetrafluoroethylene (PTFE) is used to decrease the frictional coefficient. One of the concepts in the treated tooth cloth is to make visual determination of wear conditions of a belt tooth cloth possible and non-conspicuous wear powders by lightening of a tooth surface of a belt. Fluorine plastic can be applied as a material which is white and transparent, has an effect of reducing a frictional coefficient, and has adhesion properties which are not decreased. The fluorine plastic used here is powder PTFE. In a sample of formulation B10 in which an amount of formulation is increased to 120 parts by weight, the adhesion properties were significantly reduced and the flatness of forming yarns became slightly worse due to an increase in viscosity of a treated rubber composition by an increase of PTFE during non-vulcanization. The endurance is best in a sample of a formulation B9 of 80 parts by weight. The reason why a sample of a formulation B11 has endurance lower than a sample of a formulation B9 is that the sample of B9 has smaller temperature dependency than the sample of B11 by an improvement of crosslinking density due to an increased amount of crosslinking agent.

EXAMPLE 4

Second Rubber Layer

The second rubber layer (surface rubber layer) 10 is described hereinbelow. Since a pulley comes into direct contact with the second rubber layer, it is necessary to make a frictional coefficient of the second rubber layer lower than the first layer. Reduction in the generation of wear powders during use is also important for the second rubber layer. The list of rubber compositions used in the second rubber layer 10 is shown in Table 9. It is noted that in Table 9, formulations C1 and C2 are comparative examples and formulations C3 to C8 are examples according to the present invention.

As shown below, toothed belts were formed by the respective types of treated tooth cloths and belt body rubber layers in Table 2 and belt traveling tests with respect to high load endurance and water injection load endurance of the toothed belts were made. A treated tooth cloth is as follows:
Original canvas: Material: Nylon 66; Latitudinal yarn: 210 d×2; Longitudinal yarn: 210 d Twill;
Amount of adhesion of rubber composition in treated tooth cloth:
Second rubber layer: 40 to 50 g/m$^2$ (per 1 m$^2$ of treated tooth cloth)
First layer: 30 to 35% (weight ratio of original canvas)
Third layer: 100 g/m$^2$ (per 1 m$^2$ of treated tooth cloth)

EXAMPLE 5

Treated Tooth Cloth

The treated tooth cloths may be formed as follows. A first layer is formed by immersing an original canvas into solution of each of rubber compositions (Table 5) to impregnate and adhering the composition to the original canvas by weight ratio of dried original canvas of 30 to 35%. Then a rubber composition (Table 1), which is used as a third layer, is adhered to the back side of the first layer by an amount of adhered dried composition of 100 g per 1 m$^2$ of treated tooth cloth by use of a spreading process. Then on the surface side of the first layer is adhered a rubber composition (Table 9), which is used as a second rubber layer, by an amount of adhered dried composition of 40 to 50 g per 1 m$^2$ of treated tooth cloth by use of a spreading process to form a treated tooth cloth.

A belt body rubber layer of the toothed belt is formed of a rubber composition (compound) of rubber components to be adhered shown in Table 2 and core strands. As the core strand

TABLE 9

Rubber Components of the Second Layer

| | Formulation No. | | | | | | | |
|---|---|---|---|---|---|---|---|---|
| | C1 | C2 | C3 | C4 | C5 | C6 | C7 | C8 |
| Zetpol 2020 (1) | 100 | 100 | 90 | 90 | 90 | 90 | 90 | 90 |
| ZSC2295N (2) | — | — | 10 | 10 | 10 | 10 | 10 | 10 |
| HAF carbon | 40 | 40 | — | — | — | — | — | — |
| Titanium oxide | — | — | 10 | 10 | 10 | 10 | 10 | 10 |
| Silica (3) | — | — | — | — | — | — | — | — |
| Hydrophobic silica (4) | — | — | — | — | — | — | — | — |
| Sulfur | 0.5 | 0.5 | — | — | — | — | — | — |
| Perkadox 14/40C (5) | — | — | 15 | 15 | 15 | 15 | 15 | 15 |
| Zinc oxide | 5 | 5 | — | — | — | — | — | — |
| Stearic acid | 1 | 1 | — | — | — | — | — | — |
| RS700 (6) | 3 | 3 | — | — | — | — | — | — |
| Nocrac CD (7) | 2 | 2 | — | — | — | — | — | — |
| Nocceler TT-P (8) | 1.5 | 1.5 | — | — | — | — | — | — |
| Nocceler CZ-G (9) | 0.5 | 0.5 | — | — | — | — | — | — |
| Vulnoc PM-P (10) | — | — | 0.5 | 0.5 | 0.5 | 0.5 | 0.5 | 0.5 |
| Desmodule RE (11) | 23.5 | 23.5 | — | — | — | — | — | — |
| Phenol resin (12) | — | — | 10 | 10 | 10 | 10 | 10 | 10 |
| PTFE (13) | — | 200 | 80 | 100 | 150 | 200 | 250 | 300 |
| Potassium titanate fiber (14) | — | — | 5 | 5 | 5 | 5 | 5 | 5 |
| Zinc methacrylate (15) | — | — | 20 | 20 | 20 | 20 | 20 | 20 |
| Graphite | 60 | — | — | — | — | — | — | — |
| Nocceler TET-G (16) | — | — | 1 | 1 | 1 | 1 | 1 | 1 | the following material is used: material: K glass, Construction 3/13, Core strand adhesive layer treatment: RFL, Overcoat treatment: Chemlok 402 produced by NGF.

A structure of a treated tooth cloth is shown in Table 10.

TABLE 10

Tooth Cloth Structure

| | Tooth cloth No. | | | | | | | | |
|---|---|---|---|---|---|---|---|---|---|
| | D1 | D2 | D3 | D4 | D5 | D6 | D7 | D8 | D9 |
| 2nd layer (outermost layer treatment) | C1 | C2 | C3 | C4 | C5 | C6 | C7 | C8 | — |
| 1st layer (impregnation treatment) | B1 | B1 | B9 | B9 | B9 | B9 | B9 | B9 | B9 |
| 3rd layer (adhesive layer treatment) | A1 | A1 | A7 | A7 | A7 | A7 | A7 | A7 | A7 |

D1 and D2: graphite and PTFE comparison in conventional treatment;
D3-D8: Effect of PRFE;
D9: Effect of presence and absence of second layer A toothed belt was formed of the above-mentioned belt body rubber layer and a treated tooth cloth and belt travel tests were made. The results of high load endurance tests are shown in Table 11 and the results of water injection load endurance tests are shown in Table 12. It is noted that the high load endurance test was made by training a toothed belt between a driving pulley and a driven pulley disposed in parallel to each other and causing the belt to travel, and the water injection load endurance test was made by training a toothed belt between a driving pulley and a driven pulley disposed vertically and causing the belt to travel while injecting water to a contact entrance position between the lower pulley and the toothed belt to make a belt traveling test.

TABLE 11

High Load Endurance Test

| Tooth belt No. | Q1 | Q2 | Q3 | Q4 | Q5 | Q6 | Q7 | Q8 | Q9 |
|---|---|---|---|---|---|---|---|---|---|
| Tooth cloth No. | D1 | D2 | D3 | D4 | D5 | D6 | D7 | D8 | D9 |
| Downtime (Hr) | 117 | 155 | 235 | 250 | 299 | 320 | 248 | 236 | 198 |
| Weight reduction (g) | 2.9 | 2.1 | 1.4 | 1.4 | 1.1 | 0.9 | 1.6 | 1.9 | 1.3 |

Tooth pitch: 8 mm; Number of links: 125; Width: 25 mm; Number of pulley teeth: 30, 30; Rotating speed: 3000 r/m; Load tourque: 80.3 Nm; Atmospheric temperature: room temperature (~25-27° C.); Mounting tension: 382 N.

The weight reduction (g) represents weight reduction after passage of 100 hours and the larger a numeral value the greater the rubber powder and wear.

TABLE 12

Water Injection Load Endurance Test

| Tooth belt No. | Q1 | Q2 | Q3 | Q4 | Q5 | Q6 | Q7 | Q8 | Q9 |
|---|---|---|---|---|---|---|---|---|---|
| Tooth cloth No. | D1 | D2 | D3 | D4 | D5 | D6 | D7 | D8 | D9 |
| Downtime (Hr) | 279 | 501 | 811 | 821 | 815 | 823 | 793 | 747 | 816 |

Tooth pitch: 8 mm; Number of links: 125; Width: 25 mm; Number of pulley teeth: 30, 30; Rotating speed: 3000 r/m; Load tourque: 20.5 Nm; Mounting tension: 382 N; Amount of injected water: 1 L/min; SUS pulley.

In high load endurance test, a sample of Q1 is obtained by formulation of 60 parts by weight of graphite to the second layer. In this case endurance time of Q1 was 117 hours, which is short, and belt weight reduction in Q1 for 100 hours was twice other samples. Further, flying of rubber powders around a tester was heavy such that black wear powders of a canvas adhered to portions around the pulley.

A sample Q2 exhibited an effect of lower frictional coefficient as compared with Q1 in PTFE, and showed elongation for endurance time. However, this generally results in more brittleness of a rubber formulation or composition, which is a PTFE containing matrix and was exhibited for the same reason as Q1 as compared with treated tooth cloths of samples of Q3 to Q9. In a case where an amount of formulation of PTFE is increased in the treated tooth cloth, when it exceeds 250 parts by weight, a slight reduction of endurance life was confirmed. However, as compared with a sample of Q9, which is not subjected to outermost layer treatment, the lives of Q2 were extended. Particularly, samples Q5 and Q6, which formulated PTFE by 150 to 200 parts by weight, exhibit 1.5 times endurance with respect to a sample of Q9.

This is considered to be due to the fact that there is no reduction in performance of a treated tooth cloth by the second rubber layer (outermost layer) treatment as in the combination of the previous graphite and formulation A1 (Table 1), low frictional coefficient of a belt tooth surface, and strength retention of a treated layer can be exhibited with a good balance.

The water injection test results are as follows. Samples of Q3 to Q9 have a slight effect of treatment difference in the second layer (outermost layer) and substantially the same results of endurance lives. This is considered to be so since water continuously splashes on a tooth surface and there is a decrease in friction by water. The reduction in the effect of friction coefficient due to PTFE, therefore, is not so required. Resistance to water of a treated layer may provide a large factor of life determination and it can be said that in the test, three effects of tight crosslinking density due to an increased amount of crosslinking agent reviewed and formulated in the first layer, enhancement of strength of a matrix rubber due to an increased amount of zinc methacrylate, and an improvement of adhesion properties with respect to an original canvas due to addition of potassium titanate, led to improvement of watertight endurance. Further, belts of treatment Q1 and Q2 each had large reduction of physical properties of a matrix rubber due to graphite and PTFE, and were early swelled by water whereby wear resistance of a treated tooth cloth was decreased and water came into early contact with core strands. Thus it can be said that the belt life was short.

Comparison between the RFL canvas and D6 treatment (toothed belt of Q6) was made. Materials used in the original canvas and the first layer treatment are as follows:

Original canvas—Material: Nylon; Latitudinal yarn: 210 d×2; Longitudinal yarn: 210 d Twill
RFL—Latex: Carboxyl modified NBR
Amount of adhesion: Original canvas weight ratio: 18%.

A sample of A1 formulation in Table 13 was used as a third layer and a sample of C2 formulation therein was used as a second layer. The respective samples of A1 formulation and C2 formulation were respectively treated in RFL canvases in accordance with the combination of Table 14, and adhesion peel test of their samples with rubbers formulated in Table 2 and belt traveling test were made and the test results were compared with each other. In this case the body rubber and the core strand were the same as in a case of Q6.

TABLE 13

Formulation by Adhesion to a RFL Canvas

| | Formulation No. | |
|---|---|---|
| | A1 Adhesive rubber of 3rd layer (100 g/m²) | C2 2nd layer rubber (60 g/m²) |
| Zetpol 2020 (1) | 100 | 100 |
| ZSC2295N (2) | — | — |
| HAF carbon | 40 | 40 |
| Titanium oxide | — | — |
| Silica (3) | — | — |
| Hydrophobic silica (4) | — | — |
| Sulfur | 0.5 | 0.5 |
| Perkadox 14/40C (5) | — | — |
| Zinc oxide | 5 | 5 |
| Stearic axid | 1 | 1 |
| RS 700 (6) | 3 | 3 |
| Nocrac CD (7) | 2 | 2 |
| Nocceler TT-P (8) | 1.5 | 1.5 |
| Nocceler CZ-G (9) | 0.5 | 0.5 |
| Vulnoc PM-P (10) | — | — |
| Desmodule RE (11) | 23.5 | 23.5 |
| Phenol resin (12) | — | — |
| PTFE (13) | — | 200 |
| Potassium titanate (14) fiber | — | — |
| Zinc methacrylate (15) | — | — |
| Graphite | — | — |

TABLE 14

| Toothed belt No. | Q10 | Q11 | Q6 | |
|---|---|---|---|---|
| Tooth cloth No. | F1 | F2 | D6 | |
| 1st layer treatment | RFL | RFL | B9 | Amount of adhesion RFL: 18%, B9:35% |
| 3rd layer treatment | A1 | A1 | A7 | Amount of adhesion All 100 g/m² |
| 2nd layer treatment | — | C2 | C6 | Amount of adhesion All 60 g/m² |
| Peel strength (N) | Rubber break | Rubber break | 210 | Rubber to be adhered; Table 2 |
| Flatness diggerence (mm) | 0.17 | 0.19 | 0.11 | |
| Downtime (Hr) | 116 | 155 | 320 | |
| Weight reduction (g) | 1.3 | 2.4 | 0.9 | |

The test results of Table 14 were as follows. That is in view of values of flatness RFL canvases have significantly large differences from each other. When molding pressure is applied to canvas forming yarns (particularly, latitudinal yarns), the forming yarns does not become flat and forms a canvas in a protruded state (see FIG. 1). Accordingly, the forming yarns are liable to be influenced by loosening due to continuous shearing force or reciprocating slip given by a pulley and tapping. Thus, filaments are loosened and although resulting large adhesion properties with an original canvas, the original canvas is liable to wear and the endurance is poor. In a sample of Q11 the life is slightly extended by an effect of PTFE. However, second layer treatment portion dropped early by the above-mentioned reasons, were not so effective.

On the other hand, it is considered that a sample of Q6 according to the present invention has high flatness. Thus, in Q6, second layer treatment portion is uniformly adhered to a tooth surface, so that the sample Q6 took such a vulcanized adhesion form that it is buried into the first layer treatment portion and peeling off only the 2nd layer treatment portion is reduced. Furthermore, since reduction of strength of a matrix rubber portion other than PTFE of the 2nd layer treatment portion is small, a state of low frictional coefficient can be continuously exhibited.

Further, a traveling stability of a toothed belt will be described below. By using a tooth surface having a low frictional coefficient in a toothed belt an effect of the traveling stability is exhibited. The traveling stability of the toothed belt in this case means that disadvantages of disorder of rotating shaft alignment in a device or the like, increased rustling with a pulley flange in accordance with an increase in side thrust force generated during overload and in a large device having large load change, breakage of the toothed belt generated by climbing up onto the flange, and one-sided wear of tooth cloth, are difficult to occur.

Further, there were defects that in a case of use in a helical belt and a crowning pulley, having a large effect of noise reduction the tooth cloth is liable to generate one-sided wear due to a large thrust force, which leads to a short life and that in use of the crowning pulley a feature of flangeless cannot be applied. However, it is considered that even in such a case to make the frictional coefficient of the tooth surface of the toothed belt low is an effective treatment. Thus, as an example, changes of a side thrust force obtained when a load is changed were compared with each other by use of a push-pull gauge. It is noted that FIGS. 13A to 13C show an embodiment of side thrust force measurement, particularly FIG. 13A is a layout view, FIG. 13B is a partially cut out schematic perspective view showing an embodiment when a toothed belt is moved pressing in the longitudinal direction of a pulley, and FIG. 13C is an explanatory view of the movement of the toothed belt.

The toothed belt and test conditions are as follows: Body rubber: rubber to be adhered; Core strand: K glass—3/13; Overcoat layer: present; Tooth pitch: 8 mm; Number of links 125, Width 20 mm; Number of pulley teeth: 19; Rotating speed: 4000 r/m; Atmospheric temperature: 24 to 26° C.; Load: 30 kgf, 40 kgf, 60 kgf. The values shown with the push-pull gauge are those obtained when, after 24 hours of belt travel, a traveling belt was moved by about 5 mm. The test results are shown in Table 15.

TABLE 15

| | Conventional belt | | | Belt of the present invention | | RFL belt | |
|---|---|---|---|---|---|---|---|
| Tooth belt No. | L1 | Q1 | Q2 | Q9 | Q6 | Q10 | Q11 |
| 1st layer treatment No. | B1 (A1) | B1 (A1) | B1 (A1) | B9 | B9 | RFL | RFL |

TABLE 15-continued

|  | Conventional belt | | Belt of the present invention | | RFL belt | |
|---|---|---|---|---|---|---|
| Tooth belt No. | L1 | Q1 | Q2 | Q9 | Q6 | Q10 | Q11 |
| 2nd layer treatment No. | — | C1 | C2 | — | C6 | — | C2 |
| 3rd layer treatment No. | A1 | A1 | A1 | A7 | A7 | A1 | A1 |
| Tooth cloth No. | K1 | D1 | D2 | D9 | D6 | F1 | F2 |
| Side thrust force (g) | | | | | | | |
| 30 Kgf | 260 | 190 | 160 | 220 | 145 | 310 | 250 |
| 40 Kgf | 325 | 225 | 210 | 240 | 170 | 370 | 275 |
| 50 Kgf | 360 | 250 | 225 | 265 | 185 | 395 | 345 |
| Result of high load endurance test (Hr) | 125 | 117 | 155 | 198 | 320 | 116 | 155 |

In the respective toothed belts, an effect of addition of friction-reducing agent was found and an effect of the reduction of a side thrust force was recognized. A sample of Q10 using a RFL canvas has high side thrust force from a condition of a low load and, thus, it can be said that a frictional coefficient of the belt tooth surface is significantly larger as compared with other samples. Further, regarding a sample of Q11, which was described in the above-mentioned flatness, the outermost layer treatment early fell down from a contact surface between forming yarn portions and a pulley at the cloth surface by rotation. It is difficult to retain the outermost treatment on the contact surface for a long period of time. Thus it is considered that a RFL portion having an early large frictional coefficient, exposes so that it comes into contact with an exposed pulley surface. The phenomenon is one that causes the RFL canvas to not exhibit high endurance. Samples of Q1 and Q2 are different from each other in graphite and PTFE, respectively. In the outermost layer treatment portion the sample of Q1 was evaluated with 60 parts of by weight of graphite and the sample of Q2 was evaluated with 200 parts by weight of PTFE. Essentially the sample of Q1 should be also evaluated by 200 parts by weight of graphite. However, if 200 parts by weight of graphite is formulated, reduction of strength of the treated layer itself is significantly large and only slight flexing of the belt after vulcanization operation drops the treated layer loosely. Thus as an amount of formulation of graphite, 60 parts by weight of graphite was a limit.

On the other hand, in the case of PTFE, even if 200 parts by weight or more is formulated, there was no limit, and a balance between performance of reducing a frictional coefficient of PTFE and a region of a matrix to be formulated is easily and excellently maintained. The samples of Q2 and Q6 (D6) each formulate 200 parts by weight of PTFE, and the difference between is only a matrix portion. The matrix portion of Q6 can sufficiently maintain its strength in spite of high filling of PTFE. Further, the moldability (flatness), adhesion properties, wear resistance and reduction of a frictional coefficient were excellently balanced. As a result it is considered that the side thrust force was further decreased by twice as compared with Q2 in endurance.

The applicability of a tooth cloth D6 (Table 10), which is an example of the present invention, to the respective types of belt body rubber layers (E2 to E6) was reviewed, wherein:

E2 HNBR sulfur formulation system
E3 HNBR organic peroxide formulation system
E4 HNBR-ZSC formulation system
E5 ZSC-EVA formulation system
E6 HNBR-ZSC-EVA formulation system.

Examples of HNBR and EVA formulation in a belt body rubber layer are shown in Table 16.

TABLE 16

| | Belt Body Rubber Layer | | | | |
|---|---|---|---|---|---|
| | S | PO | Z | ZE | HZE |
| Formulation No. | E2 | E3 | E4 | E5 | E6 |
| Zetpol 2020 (1) | 100 | 100 | 35 | — | 15 |
| Zeoforte 2295N (2) | — | — | 65 | 20 | 20 |
| Zeoforte 2195H (3) | — | — | — | 30 | 30 |
| VPKA8815 (4) | — | — | — | 50 | 35 |
| FEF Carbon | 50 | 35 | — | — | — |
| SRF Carbon | — | — | — | — | — |
| White carbon (5) | — | — | — | 5 | 5 |
| Rutile titanium oxide | — | — | 10 | 10 | 10 |
| Calcium carbonate (6) | — | — | 15 | 15 | 15 |
| Perkadox 14/40C (7) | — | 8 | 9 | 9 | 9 |
| Vulnoc PM (8) | — | 1 | 1 | 1 | 1 |
| Roubou (Prevention of aging) (9) | 1.5 | 1.5 | 1.5 | 1.5 | 1.5 |
| Stearic acid | 1 | 1 | 1 | 1 | 1 |
| Plasticizer (10) | 6 | 6 | 4 | 4 | 4 |
| Sulfur | 0.75 | — | 0.2 | 0.2 | 0.2 |
| Vulcanizing accelerator (11) | 2 | — | — | — | — |
| Zinc oxide | 5 | 15 | — | — | — |

(1) Produced by Nippon Zeon Co., Ltd. Acrylonitrile hydride rubber (Iodine value 28)
(2) Produced by Nippon Zeon Co., Ltd. Finely distributed substances of base polymer Zetpol 2020 and zinc polymethacrylate
(3) Produced by Nippon Zeon Co., Ltd. Finely distributed substances of base polymer Zetpol 2010 H and zinc polymethacrylate
(4) Produced by Bayer Cl., Ltd. Amount of vinyl acetate 60% Ethyline vinyl acetate copolymer (EVA) in which 100° C. ML1+ is 55
(5) Produced by Nihon Silica Co., Ltd. Nip sil VN3
(6) Produced by Shiroishi Kogyo Co., Ltd. Hakuennka CC (Calcium carbonate treated by fatty acid)
(7) Produced by Kayaku Skzo Co., Ltd. Organic peroxide crosslinking agent (di-tert-butyl peroxidiisopropil benzene)
(8) Produced by Ohuch Shinko Chemical Co., Ltd. N,N'-m-phenylinedimaleimide
(9) Produced by Uniroyal Chem Co., Ltd. Naugard445
(10) Produced by Asahi Denka Kogyo Co., Ltd. Trimellitic acid ester plasticizer C-9N
(11) Produced by Ohuch Shinko Chemical Co., Ltd. Nocceler TT (tetramethylthiuram disulfide)

TABLE 17

| Comparison of Physical Properties of Body Rubber in Tensile Test | | | | | |
|---|---|---|---|---|---|
| | Body rubber formulation No. | | | | |
| | E2 | E3 | E4 | E5 | E6 |
| Tensile strength (Mpa) | 21.4 | 21.9 | 33.4 | 24.5 | 26.5 |
| 100% modulus(MPa) | 4.1 | 4.2 | 9.9 | 9.7 | 10.1 |
| Elongation at fractyre (%) | 498 | 320 | 345 | 263 | 274 |
| Hardness of rubber (Hs) | 74 | 72 | 90 | 88 | 88 |

Vulcanizing physical properties 160° C.×30 minutes vulcanization.

TABLE 18

Vulcanization Physical Properties.

Body rubber formulation No.

| | E2 | E3 | E4 | E5 | E6 |
|---|---|---|---|---|---|
| Peel strength (N) | 265 | Rubber break | 205 | 216 | 245 |

160° C.×30 minutes vulcanization. Peel test in ordinary state (25° C.). Peel strength of treated canvas D6 and respective types of body rubber formulations.

Toothed belt constructions are shown in Table 19, results of load endurance tests at room temperature are shown in Table 20 and results of water injection load endurance tests are shown in Table 21. Toothed belt Q12 is a comparative example and toothed belts Q13 to Q17 are examples of the present invention. The conditions of the tests were as follows:

Treated tooth cloth—Material: Nylon 66; Latitude yarn: 210d×2; Longitudinal yarn: 210d Twill Core strand—Material: K glass; Construction 3/13

Core strand adhesion layer treatment: RFL

Overcoat: present

Load endurance test conditions—Tooth pitch: 8 mm; Number of links: 125; Width: 15 mm; Number of pulley teeth: 30T-30T; Rotation speed: 3000 r/m; Load torque: 24N·m; Mounting tension: 226N Water injection endurance test conditions—Tooth pitch: 8 mm; Number of links: 125; Width: 25 mm; Number of pulley teeth: 30T-30T; Rotation speed: 3000 r/m; Load torque: 20.5N·m; Mounting tension: 382N; Amount of injected water: 1L/min; SUS pulley.

TABLE 19

| Tooth belt No. | Q12 | Q13 | Q14 | Q15 | Q16 | Q17 |
|---|---|---|---|---|---|---|
| Belt body rubber No. | E2 | E2 | E3 | E4 | E5 | E6 |
| Tooth cloth No. | K1 | D6 | D6 | D6 | D6 | D6 |

TABLE 20

Load Endurance Tests at Room Temperature

Toothed belt No.

| | Q12 | Q13 | Q14 | Q15 | Q16 | Q17 |
|---|---|---|---|---|---|---|
| Downtime (Hr) | 774 | 1306 | 1625 | 1765 | 1711 | 1728 |
| Change (g) in weight of belt after 500 Hr | −3.2 | −1.9 | −1.0 | −0.8 | −0.8 | −0.8 |
| Mounting tension change (N) after 500 Hr (Measured just after stop) | −180 | −76 | +12 | +11 | +14 | +10 |
| Temperature of pulley surface before test and increase in pulley temperature after 24 hours | +61° C. | +49° C. | +47° C. | +48° C. | +47° C. | +47° C. |

TABLE 21

Water Injection Load Endurance Test

Toothed belt No.

| | Q12 | Q13 | Q14 | Q15 | Q16 | Q17 |
|---|---|---|---|---|---|---|
| Downtime (Hr) | 391 | 635 | 901 | 814 | 1021 | 955 |
| Failure mode | Tooth chip | Break or fracture | Break or fracture | Break or fracture | Break or fracture | Break or fracture |

The toothed belt of Q12 has substantially the same performance as a conventional toothed belt for use in an engine cam-crank drive or a general industrial application.

The toothed belts of Q13 to Q17 have enhanced in load endurance by 1.7 times as compared with the conventional toothed belt of Q12. This reason is considered to be large improvements of wear resistance and travel stability of a treated tooth cloth and their large influences on a core strand by the treatment (third rubber layer). In a case of such a test that a constant load is applied (there is no change of load), in wear of a tooth surface of the belt, a tooth bottom of the belt hardly wear and a portion from a tooth root of the belt to the tooth side thereof is liable to wear. Although there cannot be generated such a difference between both Q12 and Q13, the mounting tension of Q12 loosened by 20% from the original state and the mounting tension of Q13 is held to about 66%.

In view of temperature rise of a pulley after 24 hours, Q12 had the rise of 61° C. and the belts of Q13 to Q17 had the rise of 49° C. to 47° C. Thus it could be found that reducing of the frictional coefficient in treatment of the outermost layer effectively acted. As a result, it can be considered that there are an improvement of the wear resistance of the treatment itself and also a suitable engagement support effect. Thus this means that permanent elongation of the core strand itself is reduced by this treatment.

In an organic peroxide crosslinking rubber in the belt body rubber layers of the toothed belts Q14 to Q17, the pulley temperature does not lower but slightly rises. The reason for this is considered to be the facts that a core strand itself was slightly changed in a contraction direction or a pulley was expanded due to the frictional heat so that tension was increased judging from immediate measurement of the temperature after stop. Accordingly, it can be understood that elongation and wear of the belt itself are hardly found by about 500 hours of operation of the belt.

The belt Q13 is a sulfur crosslinking type and the belts Q14 to Q17 are all organic peroxide crosslinking type. Thus the effect of the organic peroxide was acted on the entire core strands from the belt body side, and the improvement of the wear resistance of the treated tooth cloth and further significant suppression of permanent elongation of the core strand itself were contributed to stabilization of the mounting tension. As a result both effects significantly improved a life of the belt. A change of weight in the belts Q14 to Q17 reached to ¼ of that of the belt Q12 and the release of the rubber powders was also significantly reduced.

The toothed belt Q15 is a formulation in which HNBR is filled with ZSC. However, in a conventional case of high filling with ZSC, the physical properties of a rubber is significantly improved, but it was a problem that the conventional formulation significantly reduced the adhesion properties to other composite materials. However, by use of the treated tooth cloth excellent physical properties of ZSC could be sufficiently exhibited. Further, even mixing of a polymer such as EVA or the like to the formulation may add superior belt performance.

Regarding water resistance only the belt Q12 generated a failure due to tooth chipping and other belts Q13 to Q17 were all break or fracture. It is considered that in Q12, swelling of water in the third rubber layer (adhesive layer) significantly reduced the strengths of the treated tooth cloth itself and adhesive joint to the body rubber so that tooth chipping occurred before break or fracture due to influence of water on the core strands. On the contrary, it is thought that in the belt Q13 reduction of strength in the treated tooth cloth is small and resistance to water can be maintained.

In the organic peroxide system of the belts Q14 to Q17, the more an amount of formulation of ZSC the more the life of water resistance was likely shortened. However, alloying of the composition with EVA could improve water resistance. It is considered that the formulation of EVA lowers oil resistance. However, these toothed belts Q14 to Q17 are very preferable to a driving belt for a bicycle and the like used outdoors.

As explained above, when the treated tooth cloth according to the present invention was used in combination with belt body rubber layers using a HNBR sulfur system, a HNBR organic peroxide system, a HNBR-ZSC system, and a HNBR-ZSC-EVA system, it could improved conventional belt performance. Further, by coloring a canvas in a pale color and coloring a belt body rubber in colors other than black an easy determination of wear limits of the tooth clothes can be easily made.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

A patent document is cited in the foregoing specification in order to describe the state of the art to which this invention pertains. The entire disclosure of this citation is incorporated by reference herein.

What is claimed is:

1. A toothed belt comprising a plurality of teeth portions on at least one surface of a belt body rubber layer and a treated tooth cloth coated on the surface of said teeth portions,
   wherein said belt body rubber layer comprises a plurality of core strands buried in the longitudinal direction of the belt,
   wherein further said treated tooth cloth comprises a first layer which comprises a canvas impregnated with rubber, a second rubber layer which is formed on a surface side of said first layer and is in direct contact with a toothed pulley, and a third rubber layer which is formed on the back side of the first layer and adhered to said belt body rubber layer,
   wherein further the rubber in said first layer consists of a rubber composition comprising polytetrafluoroethylene, phenol resin, titanium oxide, a potassium titanate fiber and zinc methacrylate in a mixture obtained by formulating a hydrogenated nitrile rubber and a polymer alloy in which zinc methacrylate is finely distributed in the hydrogenated nitrile rubber in a range of parts by weight of 95:5 to 60:40, said rubber composition having an increased crosslink density by increasing the amount of crosslinking agent as compared with said third rubber layer, and
   wherein further said hydrogenated nitrile rubber has an iodine value of 4 to 56 g and said polymer alloy has a Mooney value of at least 70 at 100° C.

2. The toothed belt according to claim 1, wherein said second rubber layer comprises a rubber composition comprising polytetrafluoroethylene, phenol resin, titanium oxide, potassium titanate fiber and zinc methacrylate in a mixture obtained by formulating a hydrogenated nitrile rubber and a polymer alloy in which zinc methacrylate is finely distributed in the hydrogenated nitrile rubber in a range of parts by weight of 95:5 to 60:40, said rubber composition having an increased crosslink density by increasing an amount of crosslinking agent as compared with the rubber composition of said first layer, and said hydrogenated nitrile rubber has an iodine value of 4 to 56 g and said polymer alloy has a Mooney value of at least 70 at 100° C.

3. The toothed belt according to claim 1, wherein said third rubber layer comprises a rubber composition comprising phenol resin and hydrophobic silica in a mixture obtained by formulating a hydrogenated nitrile rubber and a polymer alloy in which zinc methacrylate is finely distributed in the hydrogenated nitrile rubber in a range of parts by weight of 99:1 to 80:20, said rubber composition having the same or smaller polymer alloy formulation ratio as compared with said first layer and second rubber layer, and said hydrogenated nitrile rubber has an iodine value of 4 to 56 g and said polymer alloy has a Mooney value of at least 70 at 100° C.

4. The toothed belt according to claim 1, wherein said belt body rubber layer comprises a rubber composition, which is a hydrogenated nitrile rubber composition and whose crosslinking system is selected from the group consisting of sulfur crosslinking and organic peroxide crosslinking.

5. The toothed belt according to claim 1, wherein said belt body rubber layer comprises a rubber composition obtained by formulating a hydrogenated nitrile rubber and a polymer alloy in which zinc methacrylate is finely distributed in the hydrogenated nitrile rubber in a range of parts by weight of 95:5 to 5:95, said hydrogenated nitrile rubber has an iodine value of 4 to 56 g and said polymer alloy has a Mooney value of at least 70 at 100° C.

6. The toothed belt according to claim 1, wherein said belt body rubber layer comprises a rubber composition obtained by formulating a polymer alloy in which zinc methacrylate is finely distributed in a hydrogenated nitrile rubber and ethylene-vinyl acetate copolymer in a range of parts by weight of 95:5 to 5:95, said polymer alloy has a Mooney value of at least 70 at 100° C. and said ethylene-vinyl acetate copolymer has an amount of vinyl acetate of 40 to 91% and has a Mooney value of 20 to 70 at 100° C.

7. The toothed belt according to claim 1, wherein said belt body rubber layer comprises a rubber composition obtained by formulating a mixture formulated by a polymer alloy in which zinc methacrylate is finely distributed in a hydrogenated nitrile rubber and ethylene-vinyl acetate copolymer in a range of parts by weight of 95:5 to 5:95, and a hydrogenated nitrile rubber in a range of 95:5 to 60:40.

8. The toothed belt according to claim 1, wherein said canvas of said treated tooth cloth comprises at least one of the groups comprising nylon 6, nylon 66, aramide fiber, and poly-para-phenylene benzoxazlole fiber.

9. The toothed belt according to claim 1, wherein said polytetrafluoroethylene has an average particle diameter of 3 to 10 μm and a surface area of 2 to 10 m$^2$/g, is powder-shaped with disintegration property, and is formulated by parts by weight of 40 to 120 with respect to a part by weight of 100 of said mixture.

10. The toothed belt according to claim 2, wherein said polytetrafluoroethylene has an average particle diameter of 3 to 10 μm and a surface area of 2 to 10 m$^2$/g, is powder-shaped with disintegration property, and is formulated by parts by weight of 80 to 300 with respect to a part by weight of 100 of said mixture.

11. The toothed belt according to claim 1, wherein said potassium titanate fiber has a fiber diameter of 0.05 to 0.6 μm, a fiber length of 1 to 20 μm, a bulk specific gravity of 3 to 4 g/cm$^3$, and is formulated in a range of parts by weight of 1 to 50 with respect to a part by weight of 100 of said mixture.

12. The toothed belt according to claim 1, wherein said phenol resin is selected from the group consisting of an alkyl phenol modified resin, a cresol modified resin, a cashew modified resin, and a pure phenol resin, wherein said phenol resin is formulated in a range of parts by weight of 2 to 50 with respect to a part by weight of 100 of said mixture.

13. The toothed belt according to claim 3, wherein said hydrophobic silica has a bulk specific gravity of 40 to 230 g/L, an average particle diameter of 0.5 to 100 μm, and is formulated in a range of parts by weight of 5 to 60 with respect to a part by weight of 100 of said mixture.

14. The toothed belt according to claim 1, wherein said zinc methacrylate formulated singly is in a range of parts by weight of 1 to 50 with respect to a part by weight of 100 of said mixture.

15. The toothed belt according to claim 1, wherein said crosslinking agent is an organic peroxide and is formulated in parts by weight of 0.5 to 30 in an amount larger than in said third rubber layer, and said organic peroxide is selected from the group consisting of 2,4-dichlorobenzoyl peroxide, benzoyl peroxide, 1,1-di-t-butylperoxy, 3,3,5-trimethyl cyclohexane, 2,5-dimethyl-2,5-dibenzoyl peroxyhexane, n-butyl-4,4-di-t-butyl-peroxyvalerate, dicumyl peroxide, t-butyl-peroxibenzoate, di-t-butyl-peroxidiisopropylbenzene, t-butylcumyl peroxide, 2,5-dimethyl-2,5-di-t-butyl peroxihexane, di-t-butyl peroxide, and 2,5-dimethyl 2,5-di-t-butyl peroxihexane-3.

16. The toothed belt according to claim 1, wherein an adhesion amount of said rubber composition of said first layer of said treated tooth cloth is present in a range of weight ratio of 30 to 80 after dry with respect to the weight of 100 of the original canvas.

17. The toothed belt according to claim 2, wherein an adhesion amount of said rubber composition of said second rubber layer of said treated tooth cloth is present in a range of weight ratio of 2 to 30 after dry with respect to the weight of 100 of the original canvas.

18. The toothed belt according to claim 3, wherein an adhesion amount of said rubber composition of said third rubber layer of said treated tooth cloth is present in a range of weight ratio of 30 to 70 after dry with respect to the weight of 100 of the original canvas.

19. The toothed belt according to claim 1, wherein said titanium oxide of said first layer is present in a range of parts by weight of 5 to 40 with respect to a part by weight of 100 of said mixture.

* * * * *

UNITED STATES PATENT AND TRADEMARK OFFICE
CERTIFICATE OF CORRECTION

PATENT NO. : 7,435,198 B2
APPLICATION NO. : 11/212786
DATED : October 14, 2008
INVENTOR(S) : Tomobuchi It is certified that error appears in the above-identified patent and that said Letters Patent is hereby corrected as shown below:

On the Title page, the Assignee (73) should be corrected as follows:

"Tsubakimoto China Co., Osaka (JP)" should be --Tsubakimoto Chain Co., Osaka (JP)--

Signed and Sealed this

Sixth Day of January, 2009

JON W. DUDAS
*Director of the United States Patent and Trademark Office*